United States Patent [19]
Akasheh

[11] Patent Number: 6,134,674
[45] Date of Patent: Oct. 17, 2000

[54] COMPUTER BASED TEST OPERATING SYSTEM

[75] Inventor: Hussein F. Akasheh, Costa Mesa, Calif.

[73] Assignees: Sony Corporation, Tokyo, Japan; Sony Trans Com, Inc., Irvine, Calif.

[21] Appl. No.: 08/988,871

[22] Filed: Dec. 11, 1997

Related U.S. Application Data

[60] Provisional application No. 60/038,874, Feb. 28, 1997.

[51] Int. Cl.[7] .................................................. G06F 11/263
[52] U.S. Cl. ................................ 714/33; 714/37; 714/46
[58] Field of Search .................................. 714/46, 31, 37, 714/32, 33, 742, 741, 39; 395/707, 705

[56] References Cited

U.S. PATENT DOCUMENTS

| | | | |
|---|---|---|---|
| 4,402,055 | 8/1983 | Lloyd et al. | 364/579 |
| 4,510,583 | 4/1985 | Walz et al. | 365/900 |
| 4,707,834 | 11/1987 | Frisch et al. | 371/20 |
| 4,760,329 | 7/1988 | Andreano | 324/73 |
| 4,760,330 | 7/1988 | Lias, Jr. | 324/73 |
| 4,766,595 | 8/1988 | Gollomp | 371/23 |
| 4,947,355 | 8/1990 | Koeman | 364/571.01 |
| 4,992,971 | 2/1991 | Hayashi | 364/900 |
| 5,107,497 | 4/1992 | Lirov et al. | 371/15.1 |
| 5,594,663 | 1/1997 | Messaros et al. | 364/550 |
| 5,950,004 | 9/1999 | Bearse et al. | 395/705 |

Primary Examiner—Robert W. Beausoliel, Jr.
Assistant Examiner—Scott T. Baderman
Attorney, Agent, or Firm—Blakely, Sokoloff, Taylor & Zafman LLP

[57] ABSTRACT

A computer based test operating system (CBTOS) which reduces the overall software development costs by minimizing the time required to generate computer based test procedures. The CBTOS has various features including a test procedure and a graphical user interface (GUI). The GUI allows non-software developers to create inter-edit test procedures for a variety of units under test (UUTs). Further, the GUI allows the definition of supporting test devices required to test a UUT as well as allowing the definition and protocols for specific UUT communications interfaces. The four main components of the CBTOS are a tolerance manager (TM), a test procedure editor (TPE), a device data manager (DDM) and a instrument interface module (IIM).

53 Claims, 41 Drawing Sheets

1490

1491 TEST STEP NAMES (DEVICE, SECTION, ITEM)

1492 UNIT OF MEASURE

1493 INSTRUMENT SETTINGS

1494 UUT TEST TOLERANCES

1495 ADVANCED DEVICE SETUP

Edit Test Procedure

PCU-Passenger Control Unit    File: pcu002.RST for: 970-0005-001

Sections:
- A4.1: UUT Selection
- A4.2: UUT Power Up
- A4.3: UUT Initialization
- A4.4: Buit in Test Verification

[Add] [Edit]
[Delete] [Save]

Items: A4.1.1: ITA verification

[Add] [Edit]
[Delete] [Copy]
[←] [→]
[Save]

Notes:

Devices:
- A4.1.1.1: Utilize Relay Group Adaptor ID Resistor Relays+
- A4.1.1.2: Setup HP34401A-Digital Multi-Meter+
- A4.1.1.3: Utilize Relay Group Adaptor ID Resistor Relays+

[Add] [Copy]
[Delete] [Setting]
[←] [→]

✓ Instrument
 Miscellaneous
 Plug-In Card
 System Utility

[Edit Items List] [Edit Sections List] [View ATP] [Save] [Open] [HELP] [EXIT]

MAIN WINDOW BUTTONS

1500

UUT NAME   2220
UUT PART   2222
TEST FILE PATH   2224
TEST ADAPTOR ID RESISTOR VALUE   2226
SERIAL NUMBER FORMAT STRING   2228
INSTRUMENT NAME   2230
PATH TO IIM   2232
PATH TO INSTRUMENT SETUP   2234
PLUG-IN CARD NAME   2236
PATH TO PLUG-IN   2238
PATH TO PLUG-IN SETUP   2240

DEVICE DATA DATABASE 135

Figure 22b

COMPUTER BASED TEST OPERATING SYSTEM

CROSS-REFERENCE TO RELATED APPLICATIONS

This application claims benefit of U.S. Provisional Application No. 60/038,874 filed Feb. 28, 1997.

BACKGROUND OF THE INVENTION (1) Field of the Invention

The present invention is related to the field of software test modules, more specifically, the present invention is related to a method and an apparatus for a computer based test operating system (CBTOS).

(2) Related Art

Many steps are inherent in bringing a product from a concept level to market. One such important step is testing product quality assurance prior to a product release. More specifically, it is necessary to perform a functional test to ensure that a product meets or exceeds operational requirements and specified tolerances. It is equally important that such functional test at a unit level be performed without the need for accessing internal subsystems and test points of the product. A typical functional test is based around measuring the stimulus/response of a unit under test (UUT) to determine a UUT's operational behavior. Exemplary UUT's may be an audio reproduce unit, a channel encoder unit or a video cassette recorder (VCR). Currently, a variety of test equipment is available for use to generate referenced stimulus signals to be input to a UUT and to confirm the responses from the UUT.

The complexity of functional tests used to test products has increased with the technological advancement in product production. Such increase in complexity is accompanied with an increase in required test time and a potential increase of human errors during the manufacturing and testing phases of product development.

Most test equipment are provisioned with remote control standard communication interfaces. As such, computer based testing is available and has led to the development of computer controlled test systems which improve test repeatability, reduce associated test time and minimize user errors and intervention.

Presently, there are numerous different types of test systems dedicated to a particular product. A given UUT may be tested using different instruments including a power supply instrument, an input/output device, etc. Given a test program, each time a particular instrument is replaced by another, the test program must be reprogrammed to accept and understand the script used by the replacement instrument. For example, given a test program which recognizes the script for a Hewlett Packard® power supply instrument, if such Hewlett Packard® power supply instrument is replaced by a different model or a different type of instrument, the test program must be reprogrammed or re-written to comprehend the new set of scripts used by the new model or new instrument.

Typically a UUT is tested using numerous instruments. The necessity of reprogramming a test program each time an instrument is replaced by a different model or a different type of instrument increases the time necessary for testing.

Given test instruments for use by a test program to test a UUT, it is desirable to have a method and an apparatus for allowing the replacement of the test instruments without the need to reprogram the associated test program.

BRIEF SUMMARY OF THE INVENTION

The present invention discloses a computer based test operating system (CBTOS) which reduces overall software development costs by minimizing the time required to generate computer based test procedures. The CBTOS of the present invention has various features including a test procedure and a graphical user interface (GUI). The present invention's GUI allows non-software developers to create inter-edit test procedures for a variety of units under test (UUTs). Further, the GUI allows the definition of supporting test devices required to test a UUT as well as allowing the definition and protocols for specific UUT communications interfaces. Additionally, the GUI of the present invention allows the management of users, passwords and authorizations.

The four main components of the CBTOS are a tolerance manager (TM), a test procedure editor (TPE), a device data manager (DDM) and a instrument interface module (IIM). The following paragraphs give a brief description of each of these four components.

The IIM of the present invention works as a layer between each instrument being utilized to test a given UUT and a given test program used to test the UUT. More specifically, given a UUT and various instruments to be used to test the UUT, whenever an instrument is replaced with a different model or a new instrument, the underlying test program must be re-written to understand the new script (communication method) used by the different model or new instrument. Since re-writing a test program is time consuming, replacing instruments during the test phase of product development increases the overall product development cycle.

The IIM of the present invention obviates the need to re-write the test program each time an instrument for testing the UUT is replaced. The IIM does so by acting as a layer between the test program and instruments by translating inputs to the instruments from the language used by the test program into language or script understandable by the new instrument or model. The IIM also works closely with the other components of the CBTOS, including the test procedure editor, the tolerance manager and the device data manager to allow a user of the CBTOS to make various changes to the test process including change in the UUT, the instruments and the test parameters used during the test.

The tolerance manager (TM) of the present invention allows the adjustment of test tolerance data of a new instrument or a new model used to test a UUT through the IIM.

The test procedure editor (TPE) of the present invention allows the generation and editing of test files to be used for each UUT during a test session. A test file stores the test data, test step names, device parameters and associated tolerances used for testing a UUT. The TPE also allows a user to make changes to data to be used during the test session by manipulating virtual panels of all devices used in the CBTOS. The TPE simply manipulates the settings on a device specific virtual panel for each test step. The TPE may then create, edit and manage the contents of the test files.

The device data manager (DDM) of the present invention ensures that minimal code changes are necessary as additional UUTs are configured for testing. Since all UUT pertinent data is separate from the test program itself, any future changes to existing units can be incorporated by modifying the UUT pertinent data in the device data database. The device data database is updated and generally maintained by the DDM. The device data database includes, but is not limited to the following: a UUT name, a UUT part number, test file path, test adapter identification resistor value, serial number format string, instrument name, path to instrument interface module, path to instrument set-up module, plug-in card name, path to plug-in interface module and path to plug-in setup module.

The modules of CBTOS may be generated in one embodiment using any programming language capable of utilizing the Win32™ software development kit (SDK) by Microsoft® Corporation of Richmond, Wash. Additionally, there are several software packages which are designed to help the generation of computer-based test software, especially applications providing the ability to design effective user interfaces. In a preferred embodiment, the TM, TPE, DDM and IIM may be generated using the LABVIEW™ software by National Instruments® Corporation of Baltimore, Md.

NOMENCLATURE

The following is a list of terms and their definitions as used herein:

Device: A software module which performs a test related action such as communication with an instrument or verification of contents of a given variable.

The following are categories of various devices:

System Device: A device which performs a system related operation such as user dialogue and delay.

Instrument Device (Instrument Interface Module): A device which allows the set-up of parameters of the desired instrument.

Plug-In Device (Plug-In Interface Module): A device which allows a set-up of parameters of a desired plug-in card attached to a computer's bus.

Miscellaneous Device: A device which performs miscellaneous operations, such as user input or analysis.

Test Executive: A module which executes test procedures of a unit under test (UUT) using specified test devices.

Tolerance Manager: A module which defines tolerance data and checks the measurement with a predefined tolerance data.

Test Procedure Editor: A module which generates and/or modifies test procedures for a UUT.

Test File: A database which contains test data, test step names, device parameters and associated tolerances.

Test File Manager: A module which manages the test file database.

Device Data Database: A database which defines the UUT's, associated devices and configurations.

Device Data Manager: A module which manages the device data database.

BRIEF DESCRIPTION OF THE DRAWINGS

FIG. 14b illustrates the contents of a test file generated and maintained by the test procedure editor.

FIG. 15b illustrates the test procedure editor window of FIG. 15a with sample data.

FIG. 22b illustrates the contents of the device data database.

DETAILED DESCRIPTION OF THE INVENTION

The present invention discloses a computer based test operating system (CBTOS) which reduces the overall software development costs by minimizing the time required to generate computer based test procedures. The CBTOS of the present invention has various features including a test procedure and a graphical user interface (GUI). The present invention's GUI allows non-software developers to create inter-edit test procedures for a variety of units under test (UUTs). Further, the GUI allows the definition of supporting test devices required to test a UUT as well as allowing the definition and protocols for specific UUT communications interfaces. Additionally, the GUI of the present invention allows the management of users, passwords and authorizations.

The four main components of the CBTOS are a tolerance manager (TM), a test procedure editor (TPE), a device data manager (DDM) and a instrument interface module (IIM).

Figure 1A:
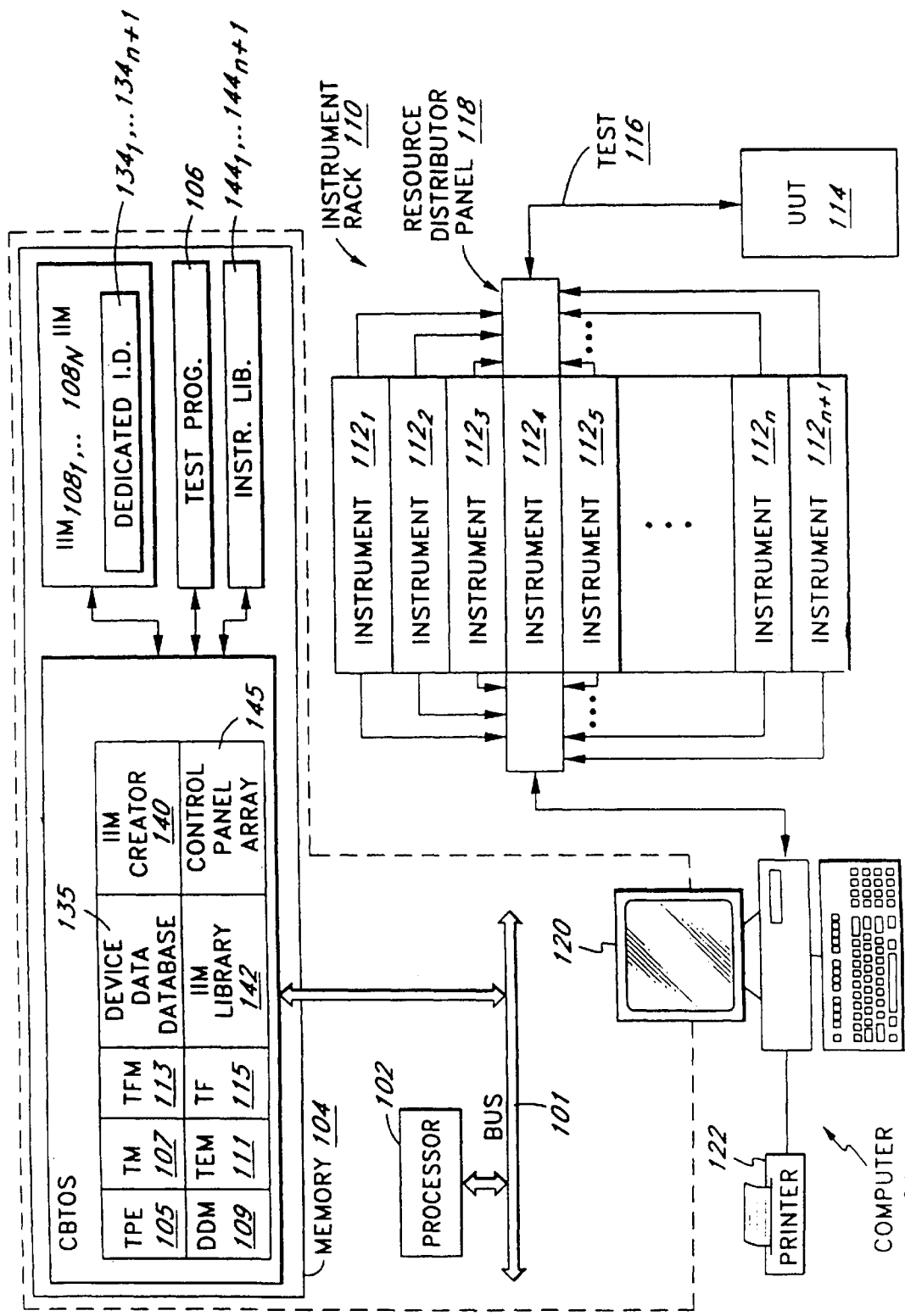
FIG. 1a illustrates an exemplary test environment using the CBTOS of the present invention.

FIG. 1a illustrates an exemplary test environment using the CBTOS of the present invention. Computer (PC) 100 has processor 102 coupled to memory 104 through bus 103. Memory 104 has a test program 106 and a CBTOS 101 including a test procedure editor (TPE) 105, a tolerance manager (TM) 107, a device data manager (DDM) 109, an instrument interface module (IIM) 108, a test executive module (TEM) 111 and a test file manager (TFM) 113.

TPE 105 generates and/or modifies test steps for a given UUT. TM 107 accepts and sets measurement and pass/fail criteria for testing a UUT. DDM 109 manages a device data database 135. The device data database 135 defines the UUT's to be tested, as well as the associated devices and configurations. IIM 105 interfaces the CBTOS modules with the various physical instruments being used to test a given UUT.

TEM 111 is the supervisory program for CBTOS 111 which controls the execution of the other modules of CBTOS 111 and regulates the flow of work in CBTOS 111.

TFM 113 manages a test file 115. Test file 115 is a database which defines test step names, device settings for testing and associated test tolerances. Processor 102 runs test program 106, TPE 105, TM 107, DDM 109, IIM 108, TEM 111 and TFM 113.

Memory 104 also has an IIM creator 140 for creating IIMs for instruments, an IIM library 142 containing IIMs created, an instrument library 144 containing various information for a specific instrument and a control panel array 145. Control panel array 145 is a database array for storing the last most recent integer and string values input by the user to the CBTOS through a graphical user interface. These values are associated with control entries in control panel array 145. There is a control entry for every input box in a CBTOS graphical user interface and corresponds to user input which is used as test parameters during testing of a UUT. The IIM dedicated to a specific instrument is originally stored in the instrument's library when the IIM is first created.

PC 100 is further coupled to an instrument rack 110 containing one or more instruments $112_1 \ldots 112_N$. Instrument rack 110 is further coupled to a unit under test (UUT) 114 through a test cable 116.

The input and output signals to and from UUT 112 are distributed through resource distributor panel 118 on instrument rack 110. Test program 106 is utilized to test UUT 114 using various instruments $112_1 \ldots 112_N$ on instrument rack 110. More specifically, various instruments $112_1 \ldots 112_N$ are given particular test parameters and test functions through their dedicated instrument drivers $134_1 \ldots 134_N$ and $IIM108_1 \ldots 108_N$. Test program 106 simply runs a test using instruments $112_1 \ldots 112_N$ with the test parameters and test functions on UUT 114. The results in the form of measurements and pass or fail results is output back to a user through monitor 120 of computer 100 or on paper through printer 122 coupled to computer 100.

Exemplary UUT's may be an audio reproduce unit, a channel encoder unit or a video cassette recorder (VCR). Exemplary instruments $112_1 \ldots 112_N$ may include a Digital Multi-Meter Model HP 34401 A, an AC Power Supply model HP 6812 A by Hewlett Packard® of Palo Alto, Calif.

Figure 1B:
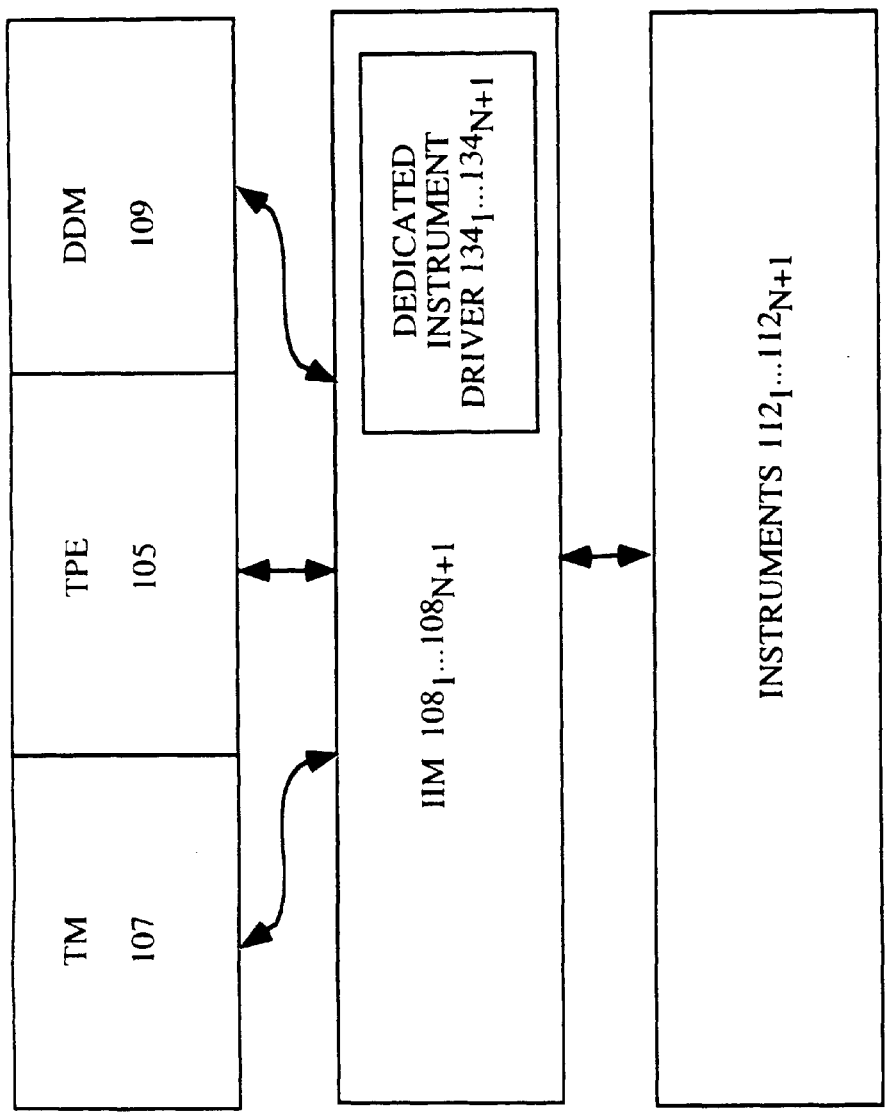
FIG. 1b illustrates the key elements of the CBTOS of the present invention.

FIG. 1b illustrates the key elements of the CBTOS of the present invention. As was illustrated in FIG. 1a, memory 104 of computer 100 has several key elements of the CBTOS 101 including instrument interface module (IIM) 108, tolerance manger (TM) 107, test procedure editor (TPE) 105 and device data manager(DDM) 109.

IIM 108 of the present invention works as a layer between each instrument being utilized to test a given UUT 114 and a given test program 106 used to test UUT 114. Typically, each physical instrument (112) being utilized for testing a UUT has its own communication method or script used to communicate with other devices. Whenever an instrument is replaced with another instrument or a different model, the test program being used to test the UUT must be re-written to understand the script (communication method) of the new instrument or model. IIM 108 of the present invention obviates this need to re-write the test program by acting as a translational layer between the new instrument or model and the test program.

Each IIM for each instrument has embedded within it an instrument driver, also referred to herein as a dedicated instrument driver 134 which is an instrument driver dedicated to a particular instrument being used to test the UUT. Dedicated instrument driver 134 is typically provided for each instrument by the manufacturer of the instrument and constitutes a collection of functions used to enable the instrument to run particular tasks.

IIM 108 performs various other functions by interacting with other modules of CBTOS 101. Other functions of the IIM 108 include the ability to compare test results with user selected test tolerance criteria to produce a final test results.

Additionally, IIM 108 prompts for and accepts user predefined instrument settings and the associated tolerance data. Once such test parameters are accepted, the particular instrument settings and associated tolerance data are fed to the corresponding instrument through a dedicated instrument driver dedicated to that particular instrument. UUT 114 is then tested utilizing the particular instrument and any results from such test are returned to IIM 108 through the dedicated instrument driver. The resulting measurement may then be evaluated by the tolerance manager (TM) 107 through IIM 108 to produce a result of a pass or a fail. The pass or fail result and/or the measurement results are then transmitted to the test program which outputs the results to the user.

TM 107 allows the user of CBTOS 101 to select test tolerance criteria to be used to test UUT 114 with various instruments $112_1 \ldots 112_N$. TM 107 performs this function by operating in two modes. Namely, in a setup mode and in an execute mode. In the setup mode, TM 107 allows a user of CBTOS 101 to set a pass/fail criteria for a specific test step when created or edited using TPE 105. The criteria is also known as tolerance. Subsequent to the test tolerance criteria being selected, the test program 106 may be run to test UUT 114 with instruments $112_1 \ldots 112_N$. After the completion of a test, TM 107 compares the return reading from instruments $112_1 \ldots 112_N$ received from any one of the instruments during TM 107's execute mode with the tolerance criteria predefined in the setup mode during the execution of the test. TM 107 then returns a pass or a fail message to TEM 111. TEM 111 is the supervisory program for the CBTOS of the present invention which controls the execution of the modules of the CBTOS and regulates the flow of work in the CBTOS.

TM 107 has various features including a graphical user interface (GUI) which allows a user to setup a desired tolerance criteria in testing a device using CBTOS 101 to generate a descriptive test. The descriptive testing outlines the tolerance setup, allows the user to communicate with the test file manager, to retrieve and save tolerance data and to verify the reading with the tolerance data.

TPE 105 allows the generation and editing of unit specific test files. TPE 105 allows a user to manipulate virtual panels of all devices to be used in the test system (CBTOS). TPE 105 manipulates the settings on a device specific virtual panel for each test step. TPE 105 is then required to create, edit and manage the contents of test files.

The TPE 105 of the present invention is based upon a three-level hierarchy. One level is a sectional level in which a group of test items that tests a major feature of the UUT. Sections denote major categories and represent the highest level of the test hierarchy of TPE 105. An example of a section entry is "audio output testing." There may be several sections per a test file.

The item level includes a group of test steps or devices which perform a test. An example of an item entry is "channel one audio output level". There may be several items per section and each item has an associated note entry which may be used for any purpose.

Finally, there is a device level which includes a test item that performs a task on a physical device or a software object. For example, a set-up HP 8903B audio analyzer™ to measure signal level by Hewlett Packard®. There may be several devices per item.

TPE 105 of the present invention is not limited to the generation of test files. TPE 105 of the present invention may be used for the generation of any type of test, such as design verification testing (DVT).

DDM 109 is responsible for maintaining the device data database storing information of the instruments used to test UUT 114. DDM 109 provides two operational modes. Namely, a database editing mode and a record retrieval mode. In the database editing mode, DDM 109 provides a graphical user interface (GUI) for the user to add, delete and/or modify all records displayed on the GUI and saved on the device data database 135. In the record retrieval mode, DDM 109 provides record database requests from test procedure editor (TPE) 105 and test executive module (TEM) 111.

DDM 109 has various features including a graphical user interface (GUI) that allows the user to view the device data database 135 and to modify and/or remove records. Additionally, DDM 109 has the ability to respond to requests from TPE 105 for providing specific data and to respond to requests from TEM 111 for providing specific data. Further, DDM 109 has the ability to call instrument setup module 146 and plug-in setup module 148 so that the user may define the desired initialization mode for the instrument used for testing UUT 114 and plug-in cards 150 for the specific UUT 114.

The modules of the CBTOS may be generated in one embodiment using any programming language capable of utilizing the Win32™ software development kit (SDK) from Microsoft Corporation of Redmond, Wash. Additionally, there are several software packages which are designed to help the generation of computer-based test software, especially applications providing the ability to design effective user interfaces In a preferred embodiment, the present invention be generated using the National Instruments® LABVIEW™ software from National Instrument® Corporation of Baltimore, Md.

Figure 1C:
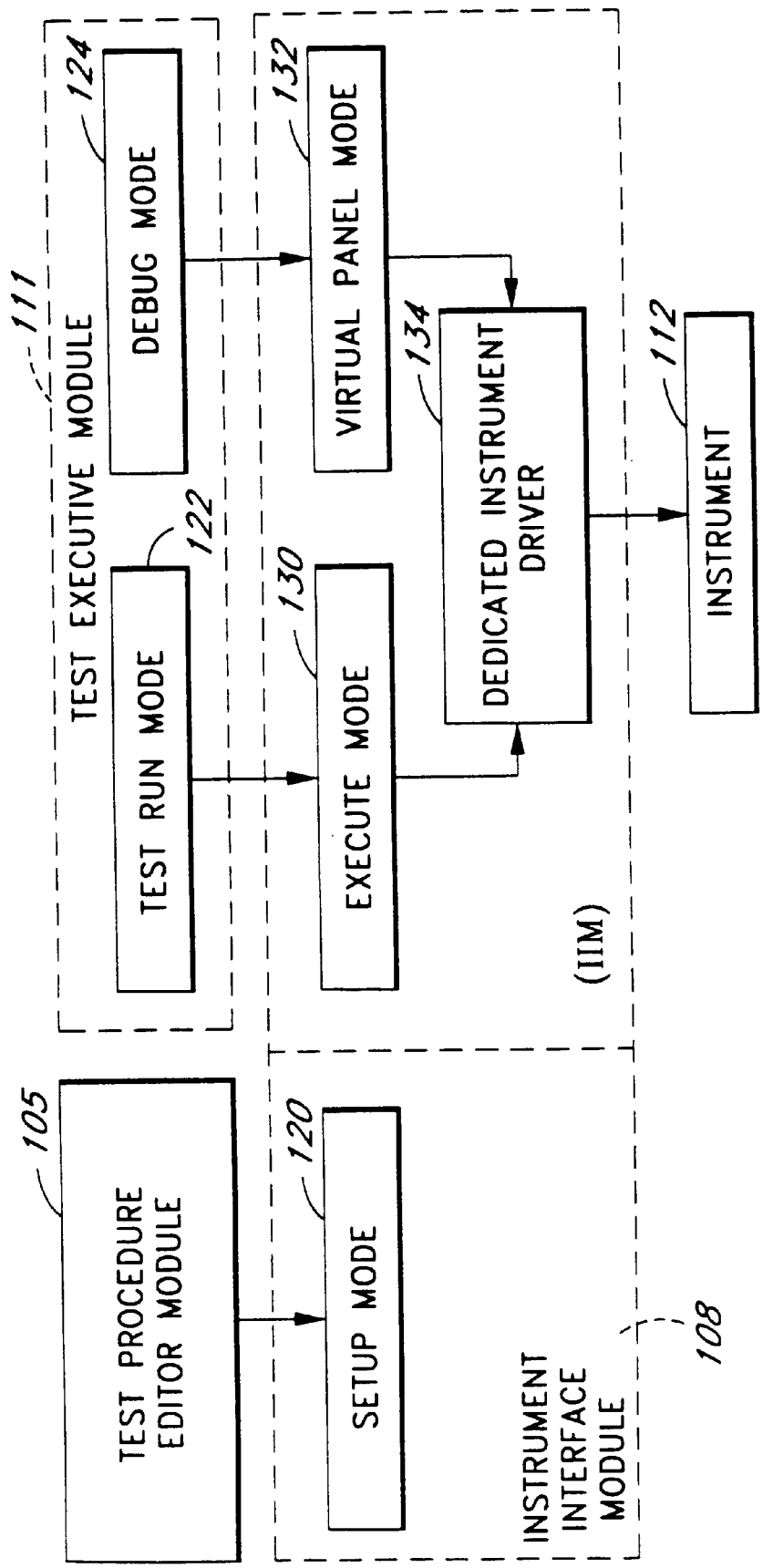
FIG. 1c illustrates the interaction between key components of the present invention.

FIG. 1c illustrates the interaction between key components of the present invention.

In setup mode 120, a user may set the parameters of an instrument that has been selected for editing using test procedure editor (TPE) 105 without the instrument being physically available. Additionally, the user may set up any number of instrument parameters and any associated tolerances through tolerance manager (TM) 107 with which the performance of the instrument or the unit under test (UUT) shall be evaluated.

Test executive module (TEM) 111 executes test procedures for a UUT using specified test devices. During test execution, TEM 111 may be in a test run mode 122 or a debug mode 124. During test run mode 122, instrument interface module (IIM) 108 is in an execute mode 130 and IIM 108 allows TEM 111 in test run mode 122 to communicate to the desired instrument and set up the instrument's parameters. IIM 108 also compares any returned measurement values with the associated tolerance data through TM 107 during execute mode 130.

During TEM 111's debug mode 124, IIM 108 is in a virtual panel mode 132 during which IIM 108 allows the user to remotely control the selected instrument through a virtual panel graphical user interface (GUI).

Figure 2A:
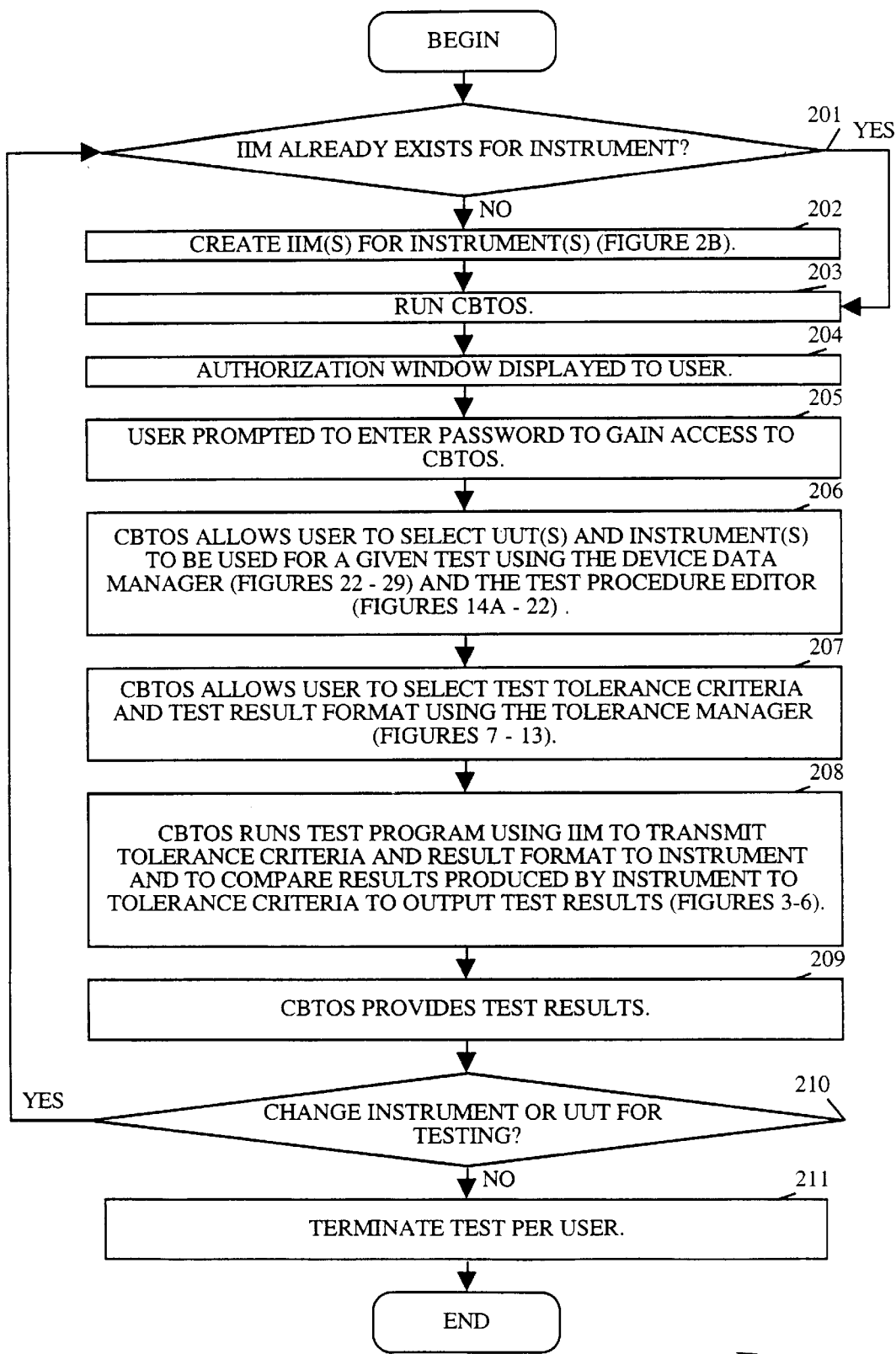
FIG. 2a is a flow diagram illustrating the general steps followed by the CBTOS of the present invention in testing a UUT.
Figure 2B:
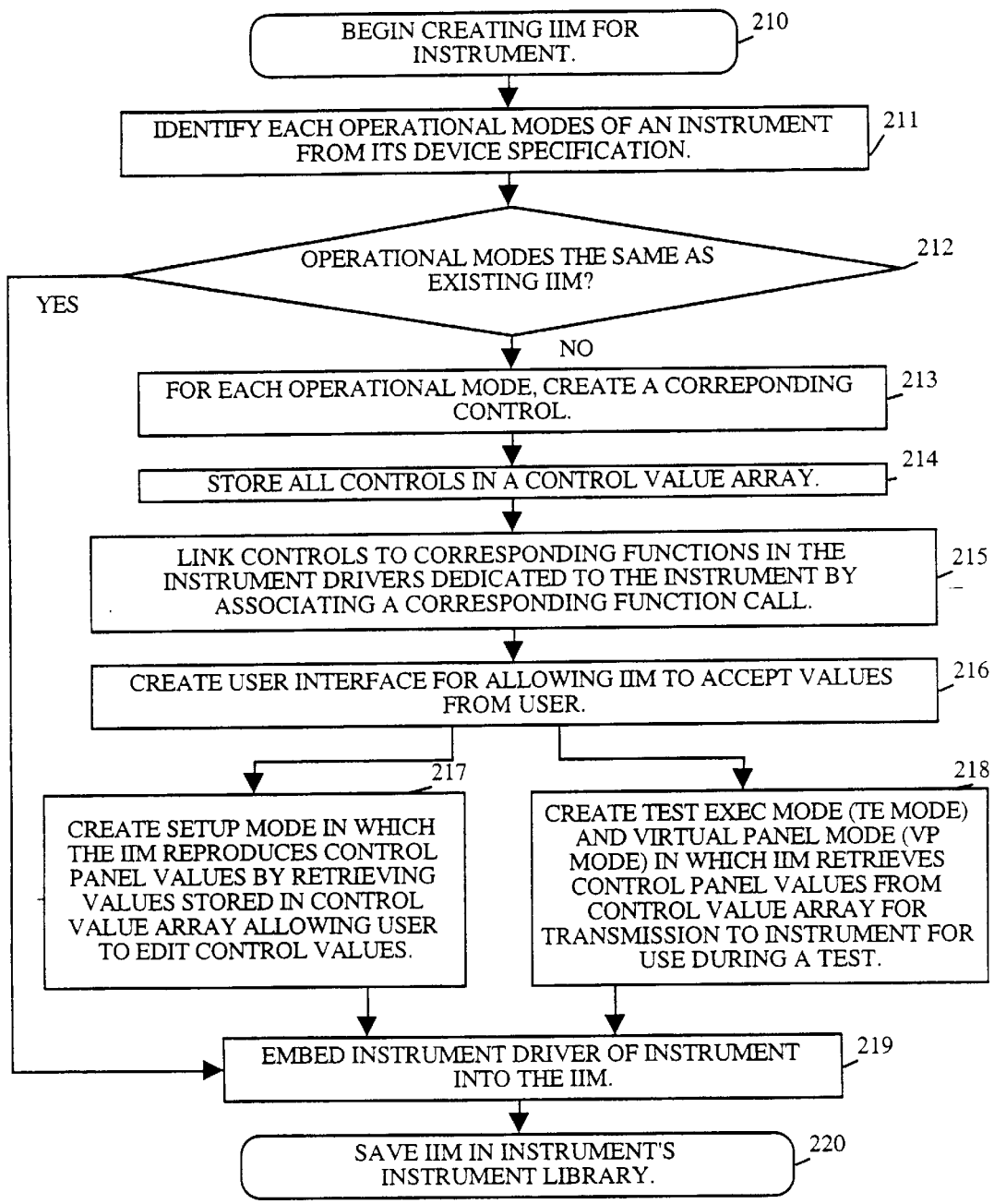
FIG. 2b is a flow diagram illustrating the general steps followed by the present invention's IIM creator in creating an IIM for an instrument to be used to test a UUT.

FIG. 2a is a flow diagram illustrating the general steps followed by the present invention in testing a UUT. In step 201, it is determined whether an IIM already exists for an instrument to be used to test a UUT. If there is no IIM for the instrument, then in step 202, an IIM is created for the instrument. FIG. 2b provides a flow diagram illustrating the general steps followed by the present invention in creating an IIM for an instrument.

Once each instrument has an associated IIM, the CBTOS is initiated to begin execution in step 203. In step 204, an authorization window (GUI) is displayed to the user. In step 205, the user is prompted to enter a valid password to gain access to the CBTOS.

Once the user gains access to the CBTOS, he/she is allowed to select UUTs and instruments for a test session using the device data manager (DDM) and the test procedure editor (TPE). FIGS. 22–29 and the accompanying text provides a detailed description of the device data manager (DDM) of the CBTOS. FIGS. 14a–22 and the accompanying test provides a detailed description of the test procedure editor (TPE) of the CBTOS.

In step 207, a user may select various test tolerance criteria for testing the UUTs using the instruments and select desired test result format by using the tolerance manager (TM). FIGS. 7–13 and the accompanying text provides a detailed description of the tolerance manager (TM) of the CBTOS In step 208, the user may then direct the CBTOS to run the test program on the UUT using the IIM to transmit the selected tolerance criteria to the instruments. FIGS. 3–6 and the accompanying text provides a detailed description of the IIM of the CBTOS.

In step 209, the test program completes the test and the CBTOS provides the test results to the user. In step 210, if the user desires to change the instruments or UUTs for testing, then instead of requiring a re-write of the test program to accommodate the new instrument or model, the present invention simply creates an IIM for the new instrument or model if none exists and the process repeats itself. Otherwise, the process may terminate per the user in step 211.

FIG. 2b is a flow diagram illustrating the general steps followed by the present invention's IIM creator in creating an IIM for an instrument to be used to test a UUT. In step 210, an IIM for an instrument is to be created. In step 211, each operational mode of an instrument is identified from the device specification of the instrument. In step 212, a look up is made to an IIM library containing existing IIMs previously created for other instruments and it is determined if the operational modes of the instrument is the same as for an existing IIM in the IIM library. If an IIM with the same operational modes, then in step 217, the dedicated instrument driver of the instrument is embedded into a copy of that IIM. In step 218, the IIM is saved in the instrument's instrument library for later use by the CBTOS.

Back in step 213, if there are no existing IIMs in the IIM library with the same operational modes, then for each operational mode of the instrument, a corresponding control entry is created. In step 214, the control entries are stored in a control panel array. There is a control entry associated with each integer and string value user input to the CBTOS. More specifically, information to be transmitted to the instrument to perform a given test including instrument settings, test tolerance data and functions to be performed by the instrument during a test each has a corresponding, control entry in the control panel array. The control panel array is a database array for storing the last most recent integer and string values input by the user in the corresponding control entry. The values are to be transmitted to the instruments for testing a UUT.

In step 215, the control entries are then linked to a function in the instrument's dedicated instrument driver. As mentioned earlier, the dedicated instrument driver is a device driver dedicated to an instrument and constitutes a collection of functions. Each function enables the instrument to perform a task. By linking a control entry from the control panel array to a function in the dedicated instrument driver, each enabled control array automatically calls the corresponding function to enable the instrument to perform the task associated with the control entry. The control entry is linked to a function in the dedicated instrument driver by having associated with the control entry a function call to the function invoking the function to begin executing.

In step 216, a user interface for the IIM is created to allow a user to input values for the control entries in the control panel array once the CBTOS begins executing.

In step 217, a set-up mode is created such that if an IIM is called by the CBTOS while in its test procedure mode, a TPE GUI is displayed to the user. The TPE GUI provides the user with control entry values for edit. The control entry values themselves are retrieved by the IIM from the control panel array and provided to the TPE GUI for the user to see and edit. A more detailed description of the set-up mode is described in the text accompanying FIG. 4.

In step 218, an execute mode and a virtual panel mode are created for the new IIM such that if an IIM is called by the CBTOS while in the test executive mode or in the virtual panel mode, the IIM retrieves the control entries from the control panel array and transmits the function calls for each enabled control entry value. Enablement of each control entry is indicated by a flag associated with them and stored along with the control entry in the control panel array. It is assumed in the text to follow that any reference to a user input (e.g. add, delete or change) to input entries (control entries) in a CBTOS module window indicates that the flag for the corresponding control entry value is enabled in case of an add or change action by the user or disabled if the control entry value is deleted. A more detailed description of the execute mode and the virtual panel mode are described in the text accompanying FIGS. 5 and 6 respectively.

In step 219, the dedicated instrument driver is embedded into the newly created IIM allowing the IIM to communicate with the dedicated instrument driver and in step 220, the IIM is saved in the instrument's instrument library.

Figure 2C:
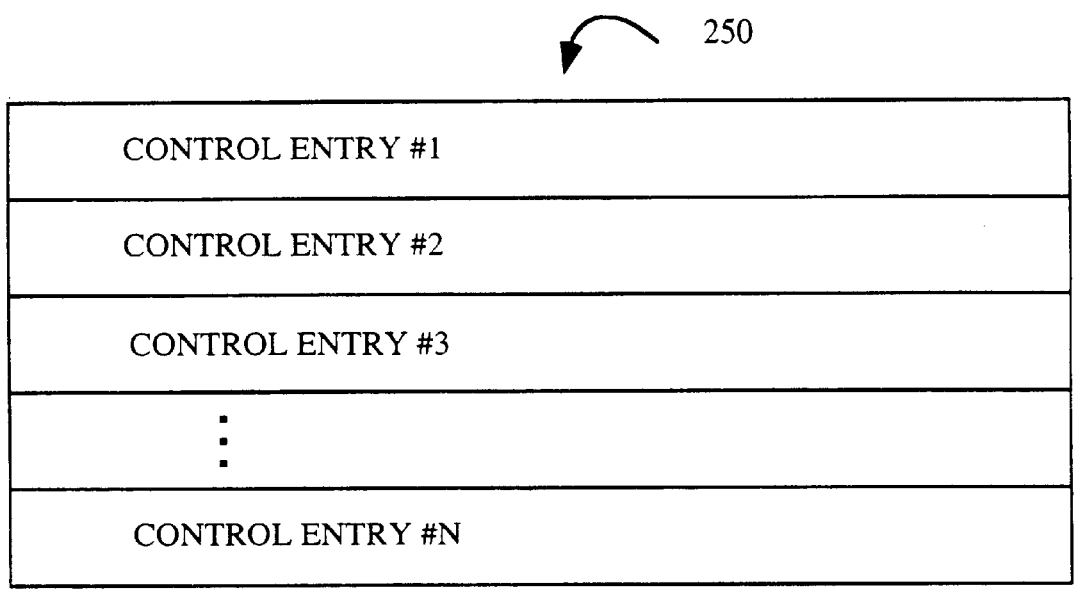
FIG. 2c illustrates an exemplary control panel array.

FIG. 2c illustrates an exemplary control panel array 250 having exemplary control entries.

In the text that follows, a detailed description of each of the four key components of the present invention's CBTOS is provided.

Instrument Interface Module (IIM)

Figure 3A:
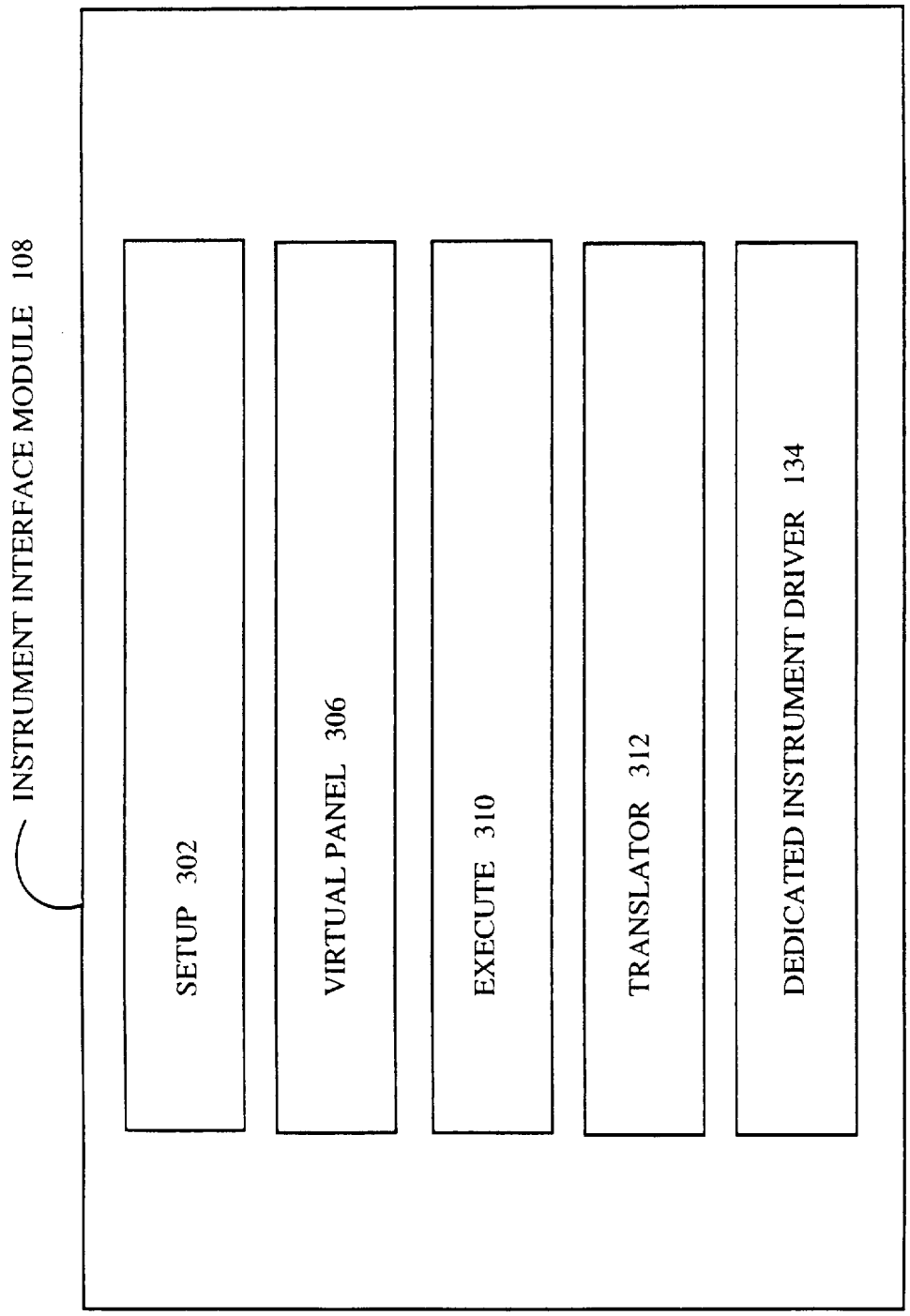
FIG. 3a illustrates the IIM of the present invention.

FIG. 3a illustrates the instrument interface module of the present invention (IIM). IIM 108 has a setup 302, a virtual panel 306, an execute 310, a translator 312 and a dedicated instrument driver 134. Setup 302 allows a user using the CBTOS to set the parameters of an instrument when selected for editing using the test procedure editor (TPE) of the present invention. Virtual panel 306 allows the user to remotely control the selected instrument through a virtual panel graphical user interface (GUI). Execute 310 allows the test executive module (TEM) to communicate to the desired instrument and set up the instrument's parameters. Translator 312 translates the inputs from TPE through setup 302, the user through virtual panel 306 and TEM through execute 310 to script understandable by the instrument. The inputs are then transmitted to the instrument through the instrument's dedicated instrument driver 134 embedded in IIM 108.

Figure 3B:
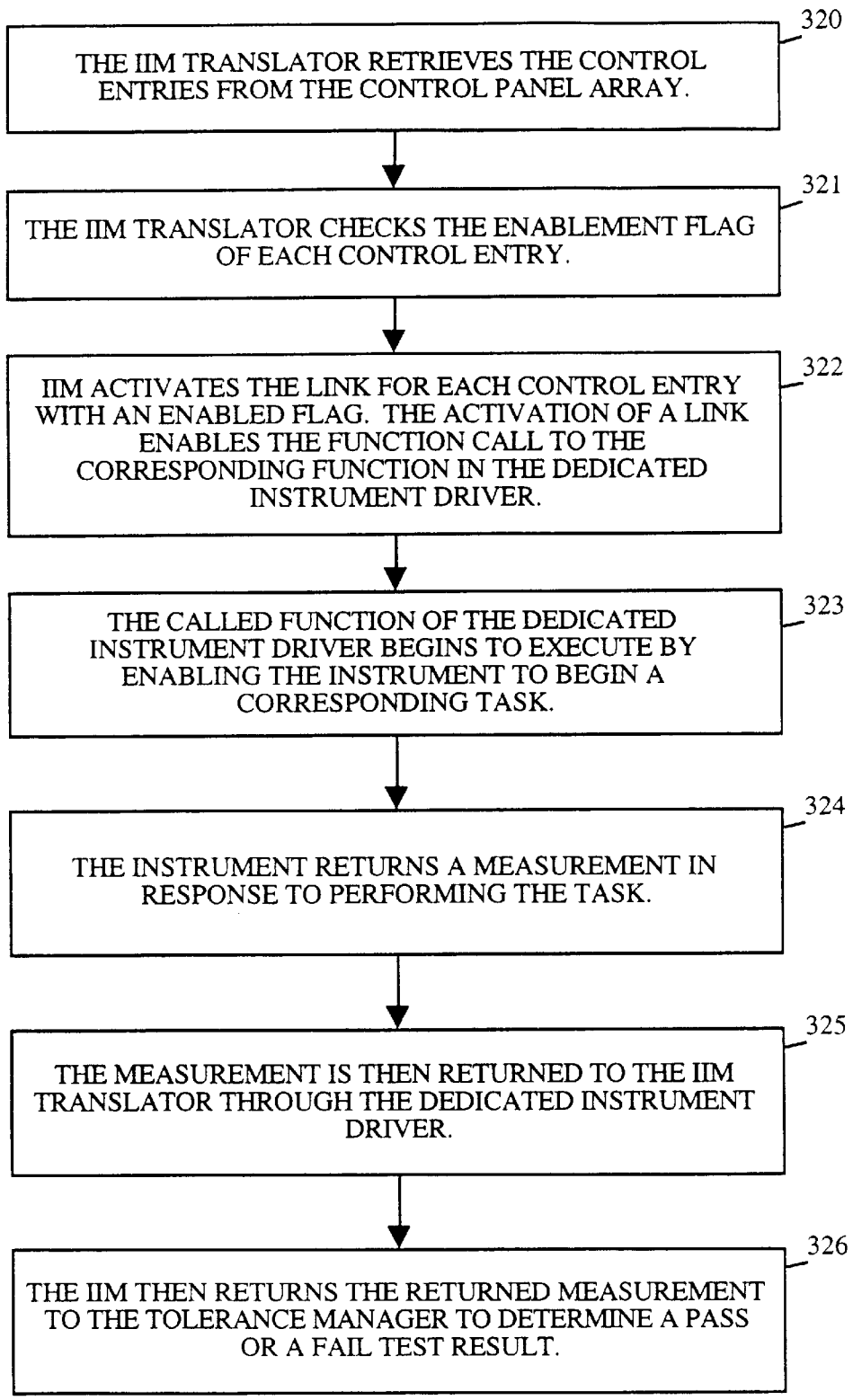
FIG. 3b is a flow diagram illustrating the general steps followed by the IIM translator.

FIG. 3b is a flow diagram illustrating the general steps followed by the IIM translator. When IIM is invoked by the CBTOS in the test executive mode or the virtual panel mode, the IIM translator performs the translation of the user inputs to the CBTOS to be transmitted to an instrument for testing a UUT. In step 320, the IIM translator retrieves the control entries from the control panel array. The control entries correspond to the last most recent user inputs to the CBTOS. Each control entry is linked to a function in the dedicated instrument driver. In step 321, the IIM translator checks the enablement flag of each control entry. In step 322, IIM activates the link for each control entry with an enabled flag. The activation of a link enables the function call to the corresponding function in the dedicated instrument driver. In step 323, the called function of the dedicated instrument driver begins to execute by enabling the instrument to begin a corresponding task. In step 324, the instrument returns a measurement in response to performing the task. In step 325, the measurement is then returned to the IIM translator through the dedicated instrument driver. In step 326, the IIM then returns the returned measurement to the tolerance manager to determine a pass or a fail test result.

Figure 3C:
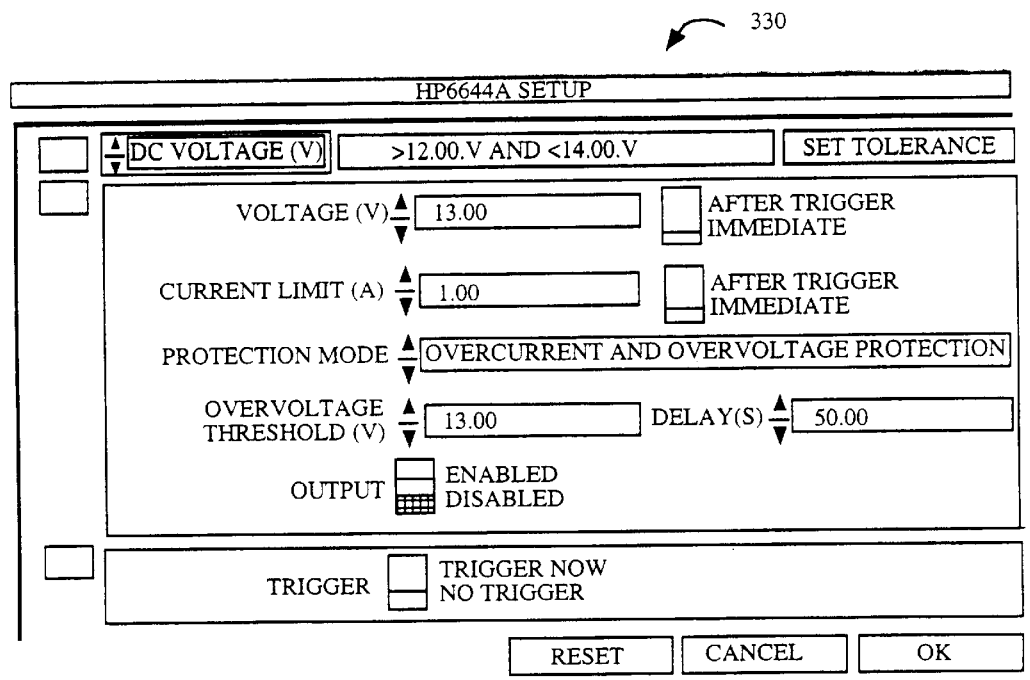
FIG. 3c illustrates an exemplary IIM setup window.

Reference is now made to FIG. 3c's exemplary IIM setup window to describe an example of the IIM's translation process. An exemplary IIM setup window 330 has exemplary control entry values. Once the user inputs these values, the control entry values are stored in the control panel array. When the IIM is called by the CBTOS in the test executive mode or the virtual panel mode, the IIM translator retrieves the control entry values from the control panel array, checks whether the entry is enabled through its flag and activates a function call to a function in the dedicated instrument driver. For example, in the setup window, the instrument used to test the UUT is to have a voltage setting of 13.00. The dedicated instrument driver has a function called "Set DC Voltage Level" and this function accepts a single floating point parameter "Volts." The function call associated with the control entry retrieved by the IIM translator is: "Set DC Voltage Level", "13.00". The corresponding function in the dedicated instrument driver is called and generates the script equivalent to the semantics of the function call and recognizable by the instrument itself as follows: "OUTP:VOLT::IMM 13.00". The script is then transmitted to the instrument.

Figure 3D:
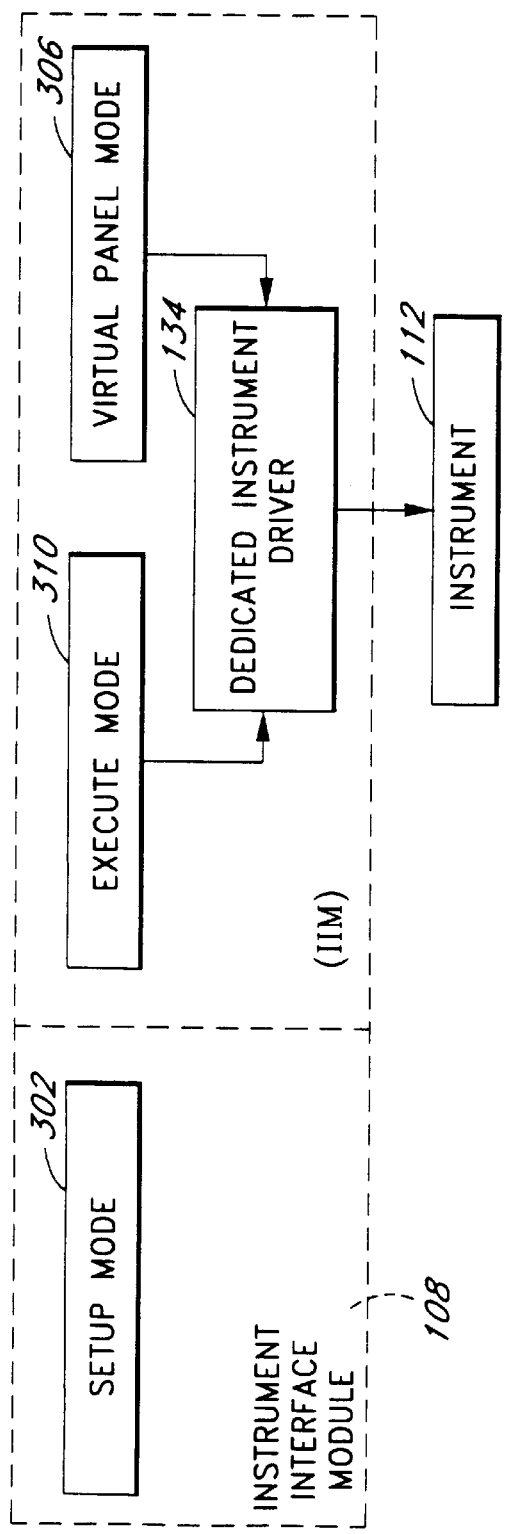
FIG. 3d illustrates operational modes of the instrument interface module (IIM) of the present invention.

FIG. 3d illustrates operational modes of the instrument interface module (IIM) of the present invention. The IIM operates in three modes: a set-up mode, an execute mode and a virtual panel mode. In the set-up mode, a user is allowed to set the parameters of an instrument when selected for editing using the test procedure editor (TPE) of the present invention. This may be performed without the instrument being physically available. The user may set any number of instrument parameters and any associated tolerances with which the performance of the instrument or the UUT shall be evaluated.

In the execute mode, the IIM allows the test executive module (TEM) to communicate to the desired instrument and set up the instrument's parameters. More specifically, during execute mode 310, IIM 108 allows TEM 111 in its test run mode to communicate to the desired instrument and set up the instrument's parameters. IIM 108 also compares any returned measurement values with the associated tolerance data through TM 107 during execute mode 310.

During TEM 111's debug mode, IIM 108 is in a virtual panel mode 312 during which IIM 108 allows the user to remotely control the selected instrument through a virtual panel graphical user interface (GUI).

The IIM is completely portable in that the IIM may be utilized along with various different types of test programs. The IIM processes the parameters entered by the user and assists the data through a dedicated instrument driver for each instrument being used to test a UUT. Thus, a test program does not have to be reprogrammed each time a different type or model of an instrument is utilized to test the UUT. This assures complete transparency to a test program of any instruments being replaced for testing the UUT, obviating the need to reprogram a test program when an instrument is replaced, dramatically decreasing the time for testing.

Figure 4:
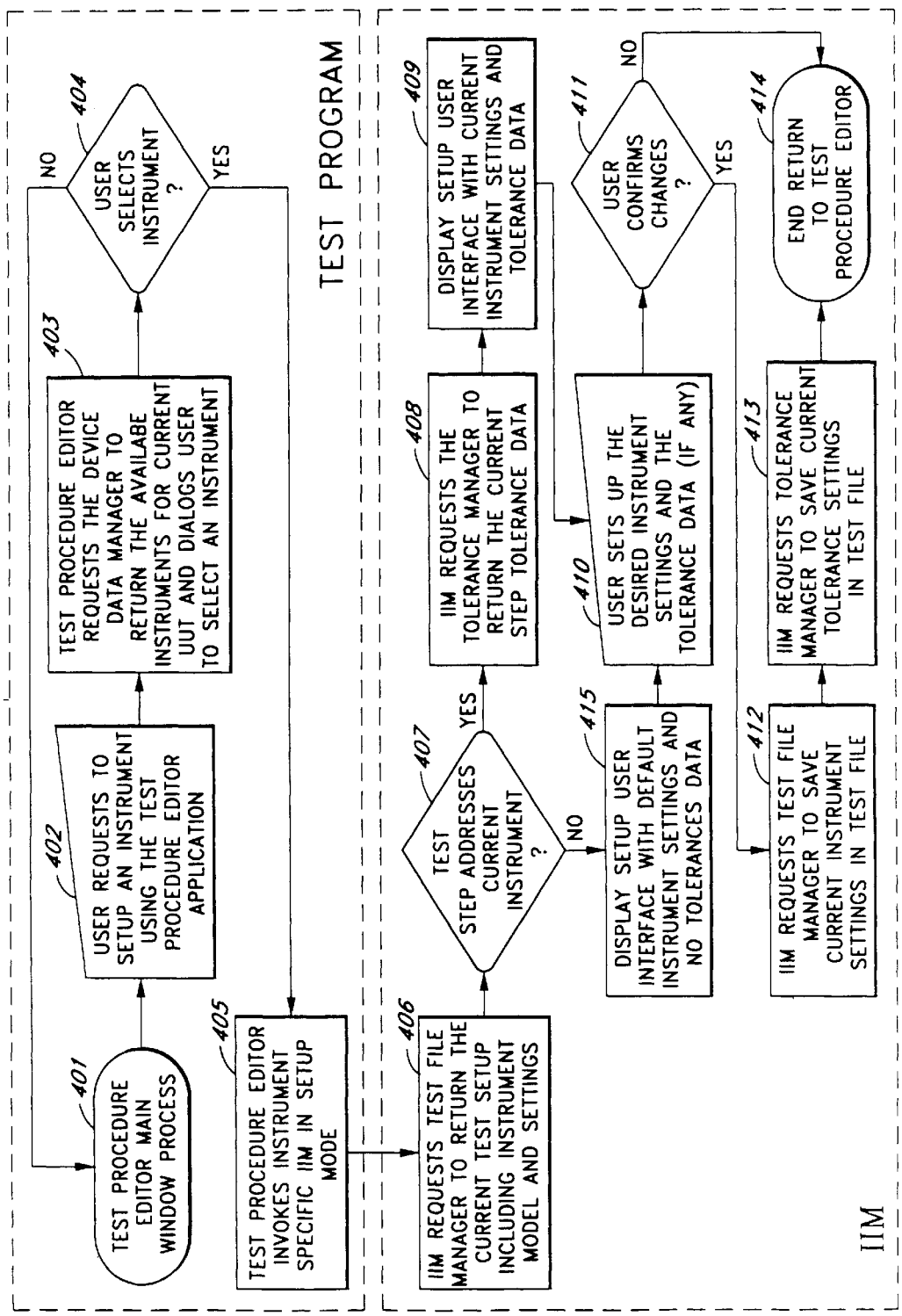
FIG. 4 is a process flow diagram illustrating the general steps taken by the IIM of the present invention during its set-up mode.

FIG. 4 is a process flow diagram illustrating the general steps taken by the IIM of the present invention during its set-up mode. In the set-up mode, the IIM of the present invention provides the capability to set up the desired instrument parameters and the associated tolerance data when called by the CBTOS specifically from the test procedure editor module. Such instrument parameters and associated tolerance data are saved until the IIM is in execute mode and the information is to be transmitted to the instrument for using during UUT testing.

In step 401, the test procedure editor module's graphical user interface (GUI) (not shown) accepts user input of parameters of an instrument to be used for UUT testing. In step 402, a user requests to set up an instrument using the test procedure editor module. In step 403, the test procedure editor module requests the device data manager to return the available instruments for testing a UUT and dialogs user to select an instrument through the GUI.

In step 404, if the user selects an instrument, then in step 405, test procedure editor invokes the instrument specific IIM. In step 406, the IIM requests the test file manager to return the current test step including instrument model and settings. In step 407, it is determined whether or not the test step addresses the current instrument. If the test step does address the current instrument, then in step 408 the IIM requests the tolerance manager to return the current tolerance data and in step 409 current instrument settings and tolerance data are displayed to the user.

In step 410, the user sets up the desired instrument settings and the tolerance data through inputs transmitted to the CBTOS through a GUI. In step 411, the user confirms changes and in step 412, the IIM requests the test file manager to save current instrument settings in the test file. In step 413, the IIM requests the tolerance manager to save current tolerance settings in the test file as well. In step 414, the process is returned to the test procedure editor of the test program. Back in step 407, if the test step address does not address the current instrument, then in step 415, the set-up user interface is displayed with default instrument settings and no tolerance data.

Figure 5:
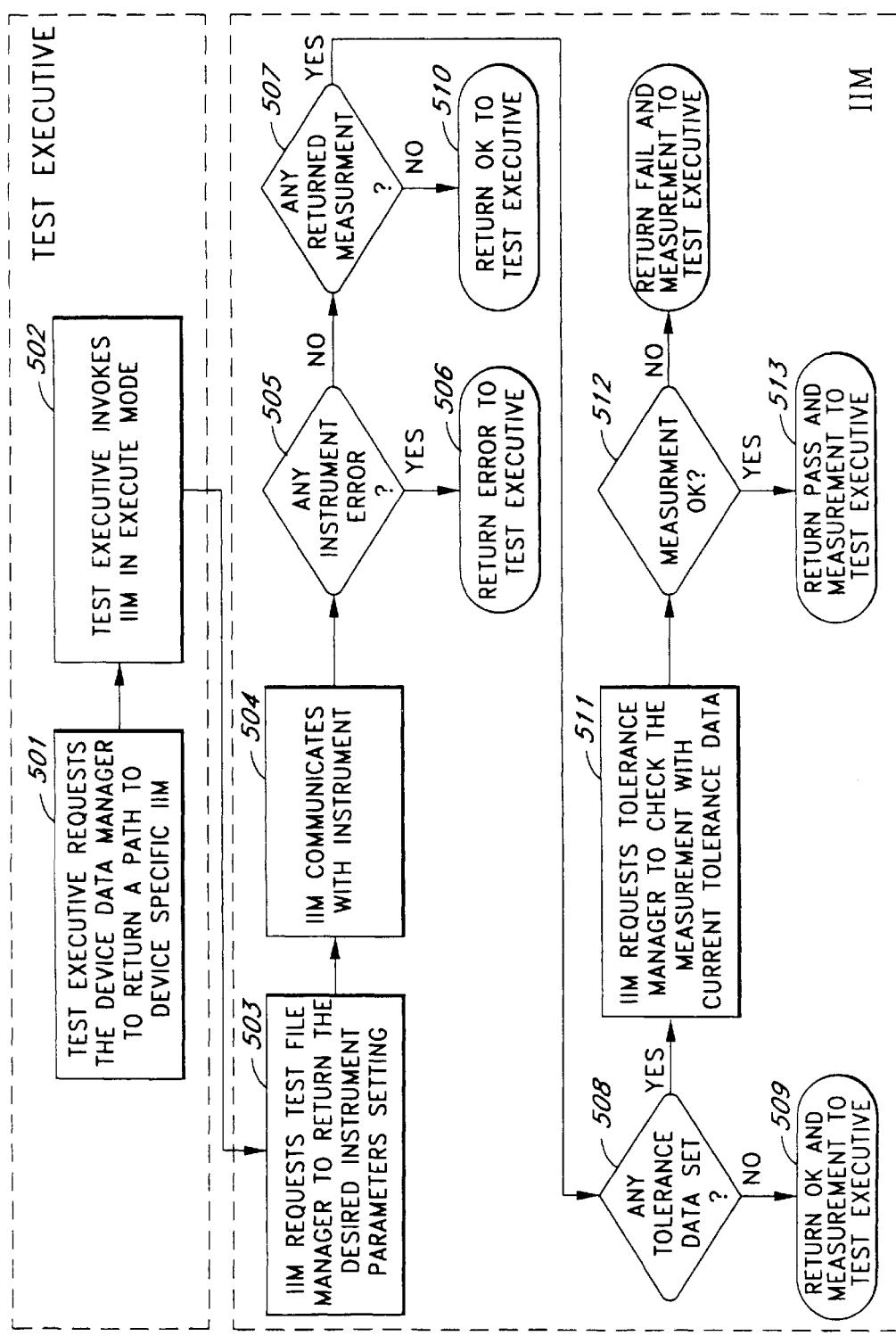
FIG. 5 illustrates an exemplary process flow diagram illustrating the general steps followed by the present invention's IIM during an execute mode.

FIG. 5 illustrates an exemplary process flow diagram illustrating the general steps followed by the present invention's IIM during an execute mode. In step 501, the test program is to be initiated and the test executive module requests the device data manager to return the path of the instrument library containing the IIM of the instrument being used. In step 502, the test executive module invokes the IIM in the execute mode using the path returned by the device data manager and the test program begins to execute. In step 503, the IIM requests the test file manager to return the desired instrument settings and any tolerance data. In step 504, the IIM communicates with the instrument by through its translator and calling its embedded dedicated instrument driver. The IIM monitors for instrument and/or communication errors and waits for measurement from the instrument resulting from the test if any.

In step 505 if there is an instrument error, then in step 506, an error message is returned to the test executive module.

Otherwise, in step 507 if there are any returned measurements, then in step 508 the IIM checks if any tolerance data exists. If there is no tolerance data, then in step 509, only the measurement value is returned to the test executive module. In step 510, if there is no returned measurement, then a phase complete message is returned to the test executive module.

In step 511, if there are returned measurement values and the tolerance data is set, then the IIM requests the tolerance manager to check the measurement with current tolerance data. In step 512, if the measurement value is within the tolerance data, then in step 513 a pass result and the measurement value is returned to the test executive module. Otherwise, a result of fail and the measurement data is returned to the test executive module.

Figure 6:
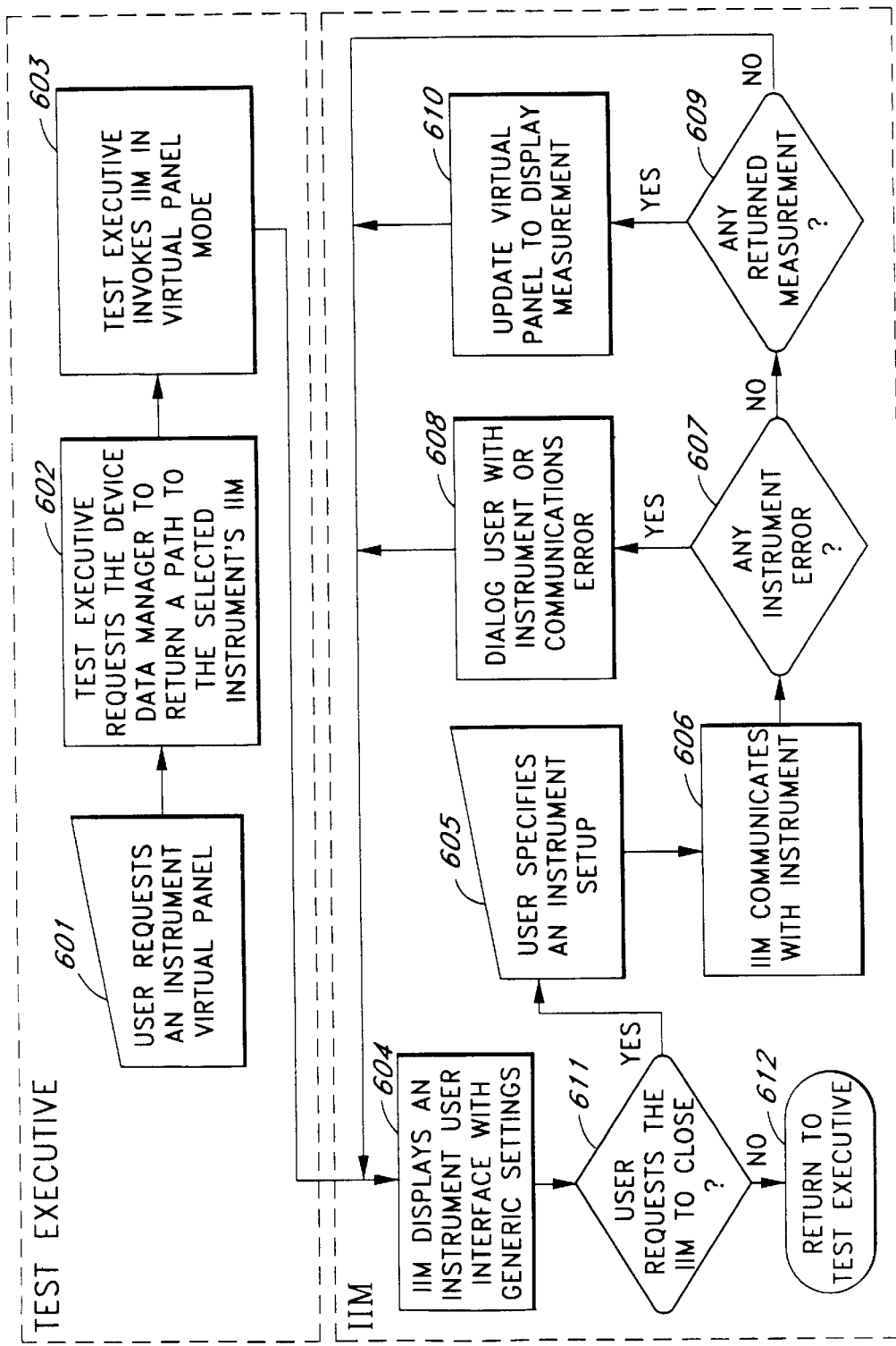
FIG. 6 is an exemplary process diagram illustrating the general steps followed by the IIM of the present invention during a virtual panel mode.

FIG. 6 is an exemplary process diagram illustrating the general steps followed by the IIM of the present invention during a virtual panel mode.

Test executive module is in a test program execution during a failure or a debug phase when, in step 601 a user requests a graphical instrument virtual panel to remotely control a specific instrument. In step 602 the test executive module of the test program requests a device data manager to return a path with selected instrument's IIM to gain access to the IIM. In step 603, the test executive module invokes the IIM in virtual panel mode. In step 604, the IIM displays an instrument user interface with generic settings and a virtual panel representing the instrument controls. At this time, in step 605, the user may set up the virtual controls and transmit the settings to the instrument. In step 606, once an instrument set-up is requested, the IIM communicates with the instrument to set-up the parameters and wait for a measurement if any. If there are any instrument errors, then in step 608 the IIM dialogs the user with an instrument or communication error. Otherwise in step 609, if there are measurements returned, then in step 610 the IIM updates the virtual panel with the measurement data. During this process if a user requests the IIM to close in step 611, then the process returns to the test executive module of the test program in step 612.

Tolerance Manager (TM)

Figure 7A:
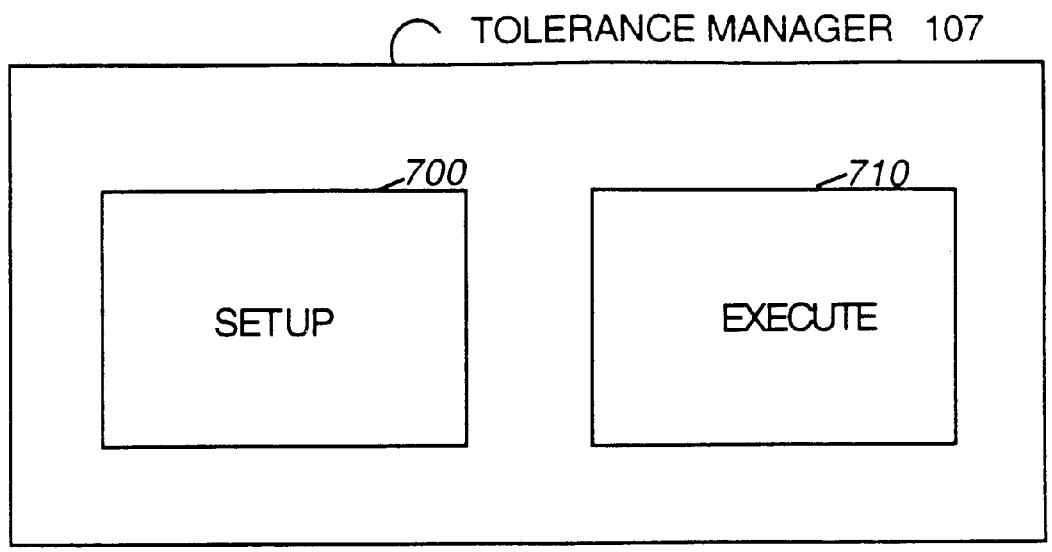
FIG. 7a illustrates the tolerance manager of the present invention.
Figure 7B:
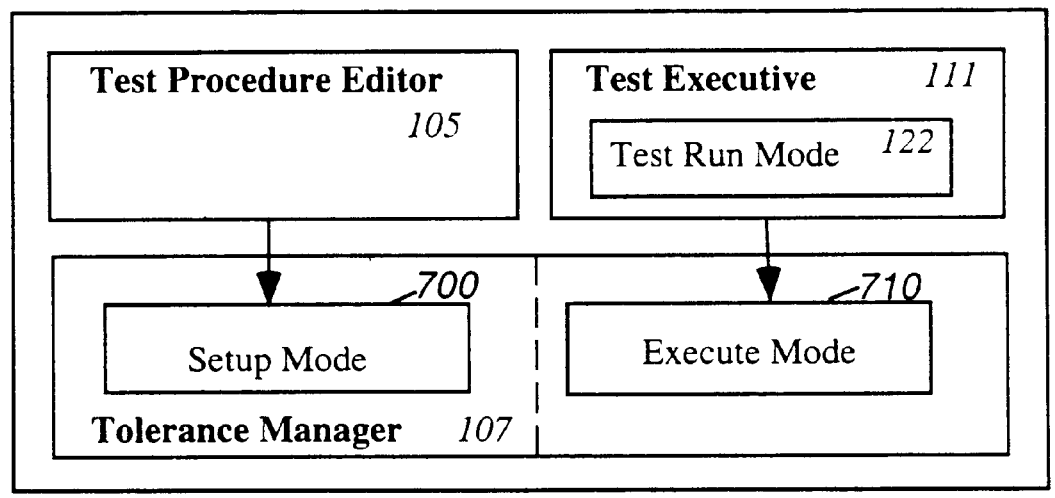
FIG. 7b illustrates the tolerance manager's operational modes.

FIG. 7a illustrates the tolerance manager of the present invention. Tolerance manager 107 has a setup 700 and an execute 710. FIG. 7b illustrates the tolerance manager's operational modes. During setup 700 which is initiated by test procedure editor (TPE) 105 and tolerance manager (TM) 107 is required to predefine the associated pass and fail criteria settings. Similarly, once test executive module (TEM) 111 is in test run mode 122 and initiates execute 710, TM 107 must predefine the associated pass or fail criteria settings of that particular test step.

Figure 8:
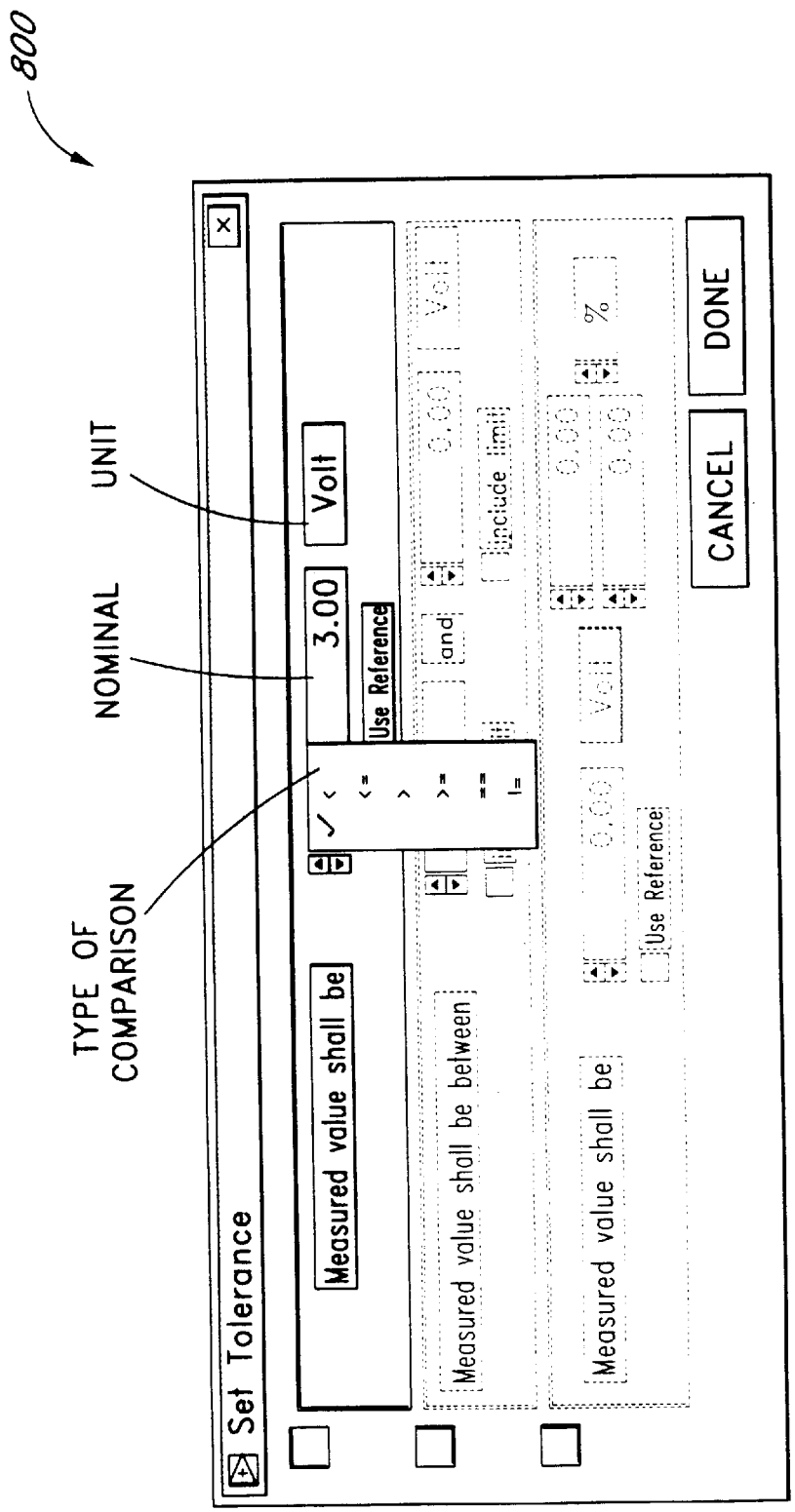
FIG. 8 illustrates a set tolerance window using a first method of allowing the user to specify a pass or fail criteria of a return measurement or response.

FIG. 8 illustrates set tolerance window 800 for the setup mode of the tolerance manager. In setup mode 700, tolerance manager (TM) 107 provides the capability to set up the desired tolerance parameters when called from test procedure editor (TPE) 105 or a launching process which launches the TM 107.

In setup mode 700, the user may specify the pass or a fail criteria of a returned measurement or response using one of three methods. In a first method, the result and reading or measurement are compared to a nominal number. More specifically, a returned reading is determined to be one of the following: greater than (>), or greater or equal to ($\geq$), or less than (<), or less or equal to ($\leq$), or equal to (=), or not equal to ($\neq$) a nominal value. In illustrated set tolerance window 800, when the returned reading is less than (<) three volts, a pass result is made.

Figure 9:
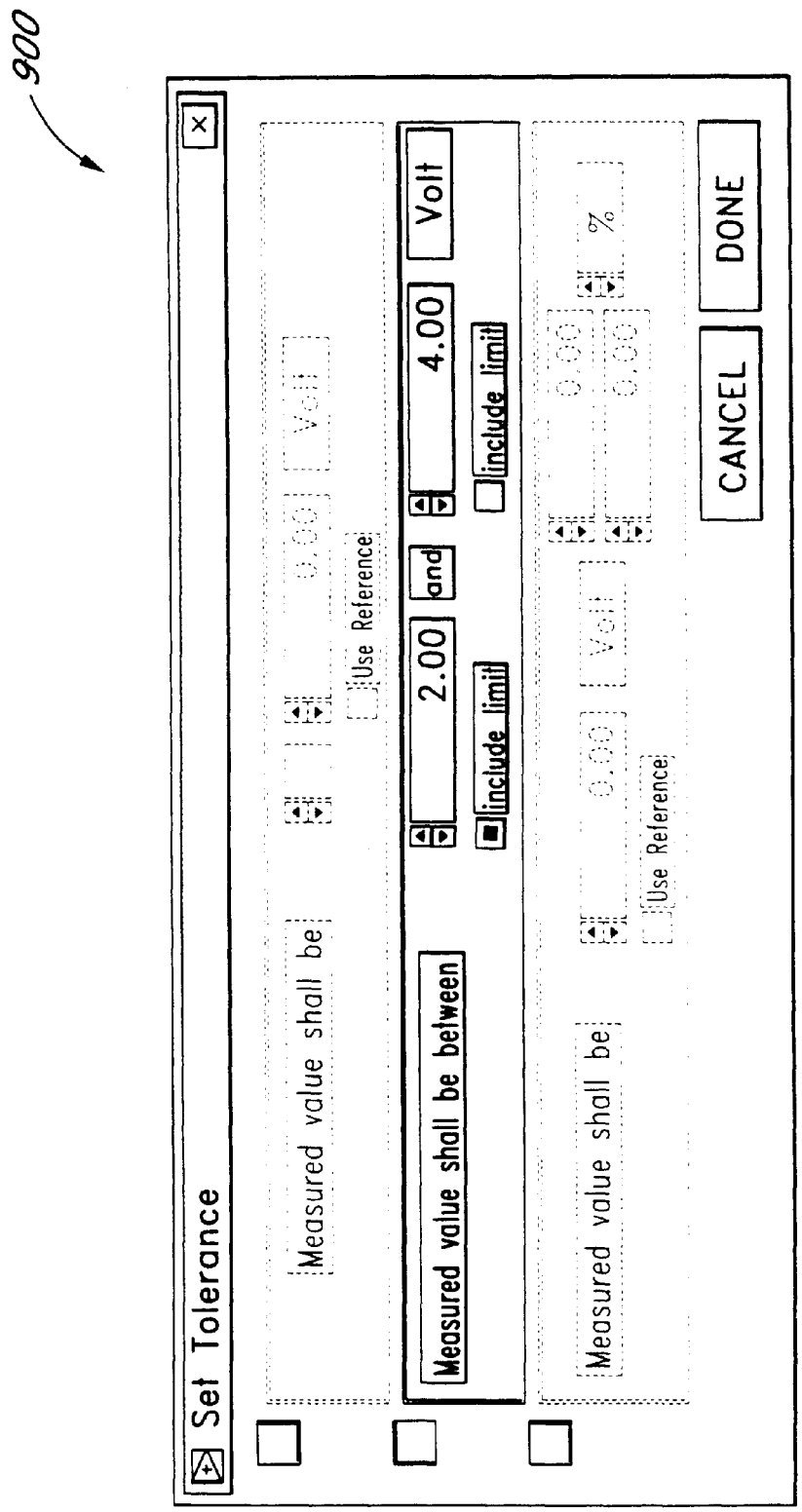
FIG. 9 illustrates the tolerance manager's set tolerance window using a second method of allowing the user to specify a pass or fail criteria of a return measurement or response.

FIG. 9 illustrates the present invention's set tolerance window 900 using the second method of allowing the user to specify a pass or fail criteria of a returned measurement or response.

In the second method the returned measurements are compared to a range. More specifically, a returned reading is determined to be within the following ranges: greater than (>) a lower limit and less than (<) an upper limit or; greater or equal to ($\geq$) a lower limit and less than (<) an upper limit or; greater than (>) a lower limit and less or equal to ($\leq$) an upper limit or; greater or equal to ($\geq$) a lower limit and less or equal to ($\leq$) or; less than (<) a lower limit and greater than (>) an upper limit or; less than (<) a lower limit and greater or equal to ($\geq$) an upper limit or; less or equal to ($\leq$) a lower limit and greater than (>) an upper limit or; less or equal to ($\leq$) a lower limit and greater or equal to (>) an upper limit.

In set tolerance window 900, a returned reading is given a pass result when the returned reading is greater than or equal ($\geq$) two volts and (<) four volts.

Figure 10:
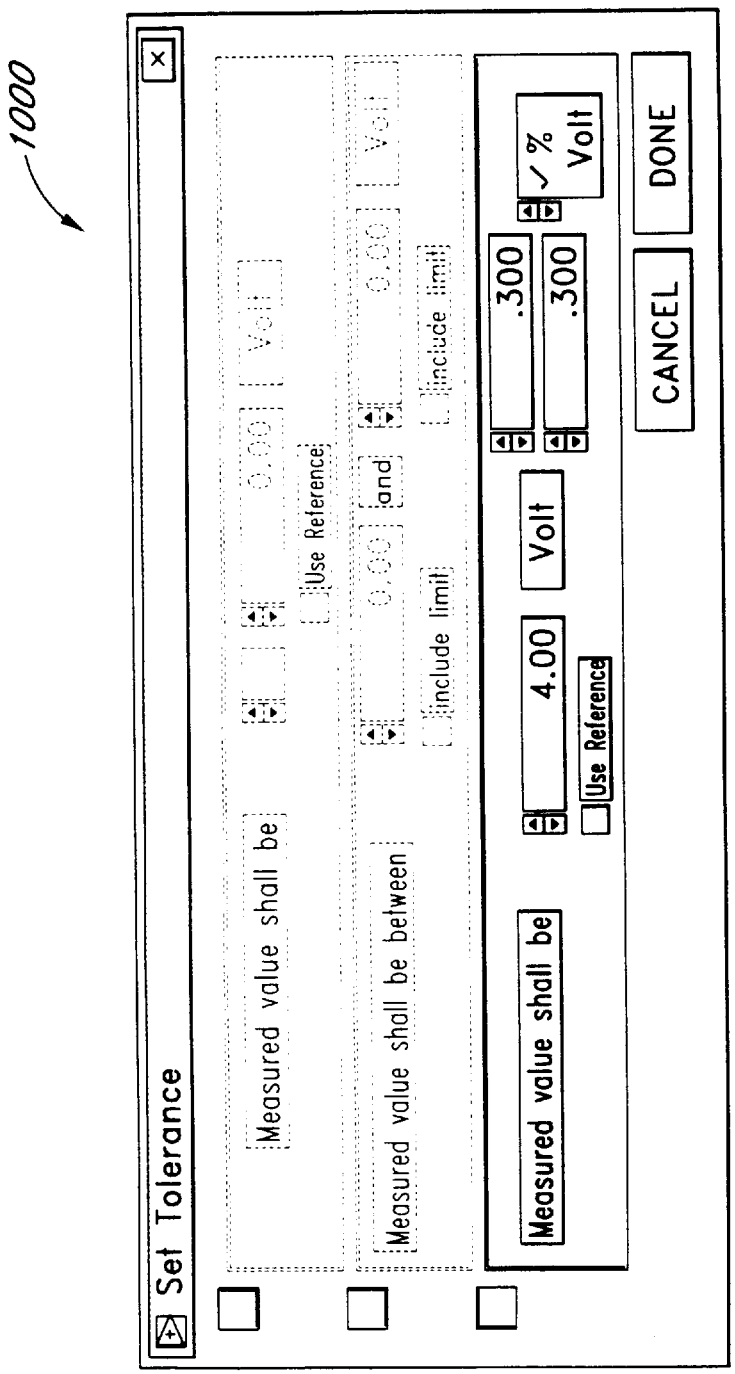
FIG. 10 illustrates a set tolerance window showing a third method of allowing a user to specify a pass or a fail criteria for a returned measurement and response.

FIG. 10 illustrates set tolerance window 1000 showing the third method of allowing a user to specify a pass or a fail criteria for a returned measurement. In the example, a pass result is determined if a returned measurement is four volts plus or minus three percent. The method compares the returned measurement to a nominal with tolerance. A pass result is determined if the returned reading is as follows: greater than or equal to ($\geq$) a nominal minus a percentage; and less than or equal to ($\leq$) a nominal plus a percentage; or greater than or equal to ($\geq$) a nominal minus a value; and less than or equal to ($\leq$) a nominal plus value. The user may also elect to specify a previously saved reading or measurement to be used in lieu of the nominal value.

Figure 11:
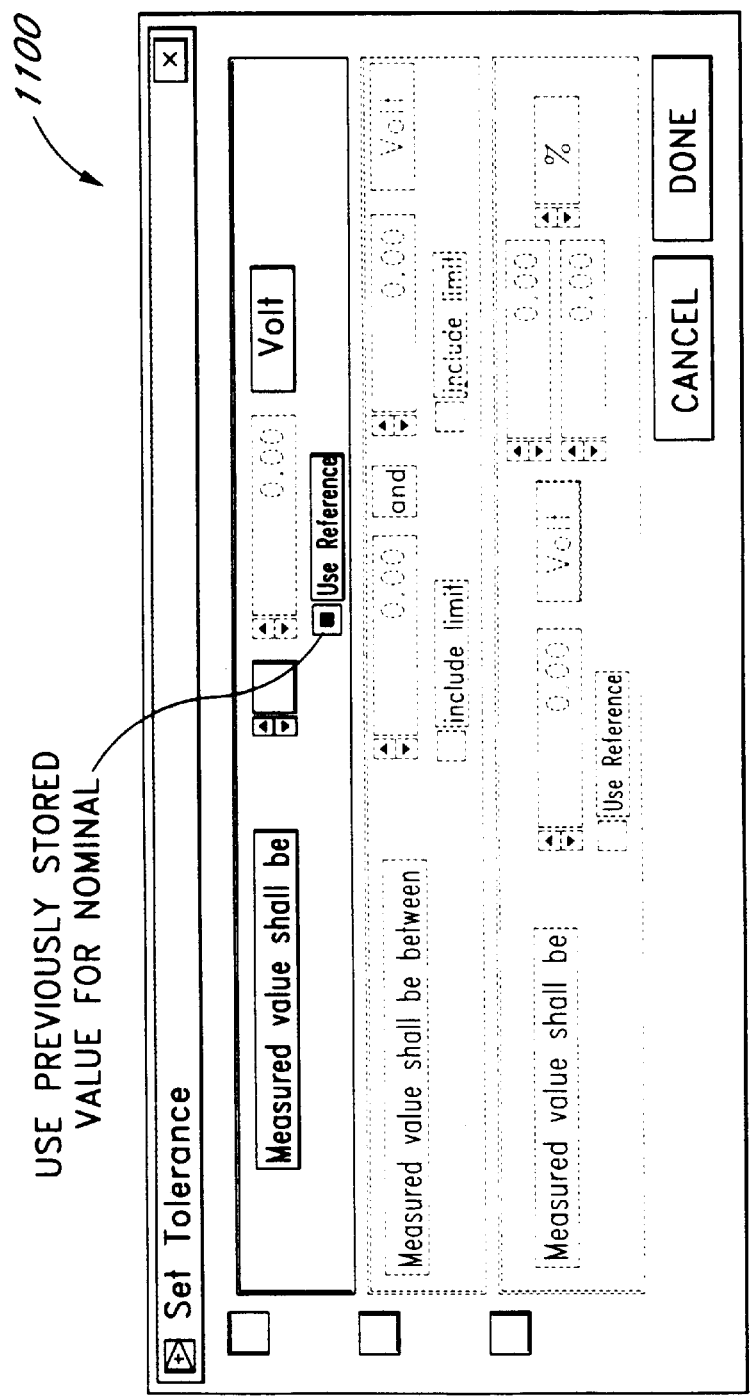
FIG. 11 is an example of a tolerance set-up requiring CBTOS to use a measured reference value in lieu of a nominal value.

FIG. 11 is an example of a tolerance set-up requiring the CBTOS to use a measured reference value in lieu of a nominal value. This method of allowing a user to specify a pass or a fail criteria for a returned measurement is very effective when a reading's pass or fail criteria is dependent upon a previous measurement. As illustrated in set tolerance window 1100, a pass criteria is determined when the returned reading is less than a certain reference voltage. With this method, the tolerance data is stored within the test step in a numerical array. If the user desires not to define a tolerance for a specific test step, then the array size is initialized to zero or empty.

Figure 12:
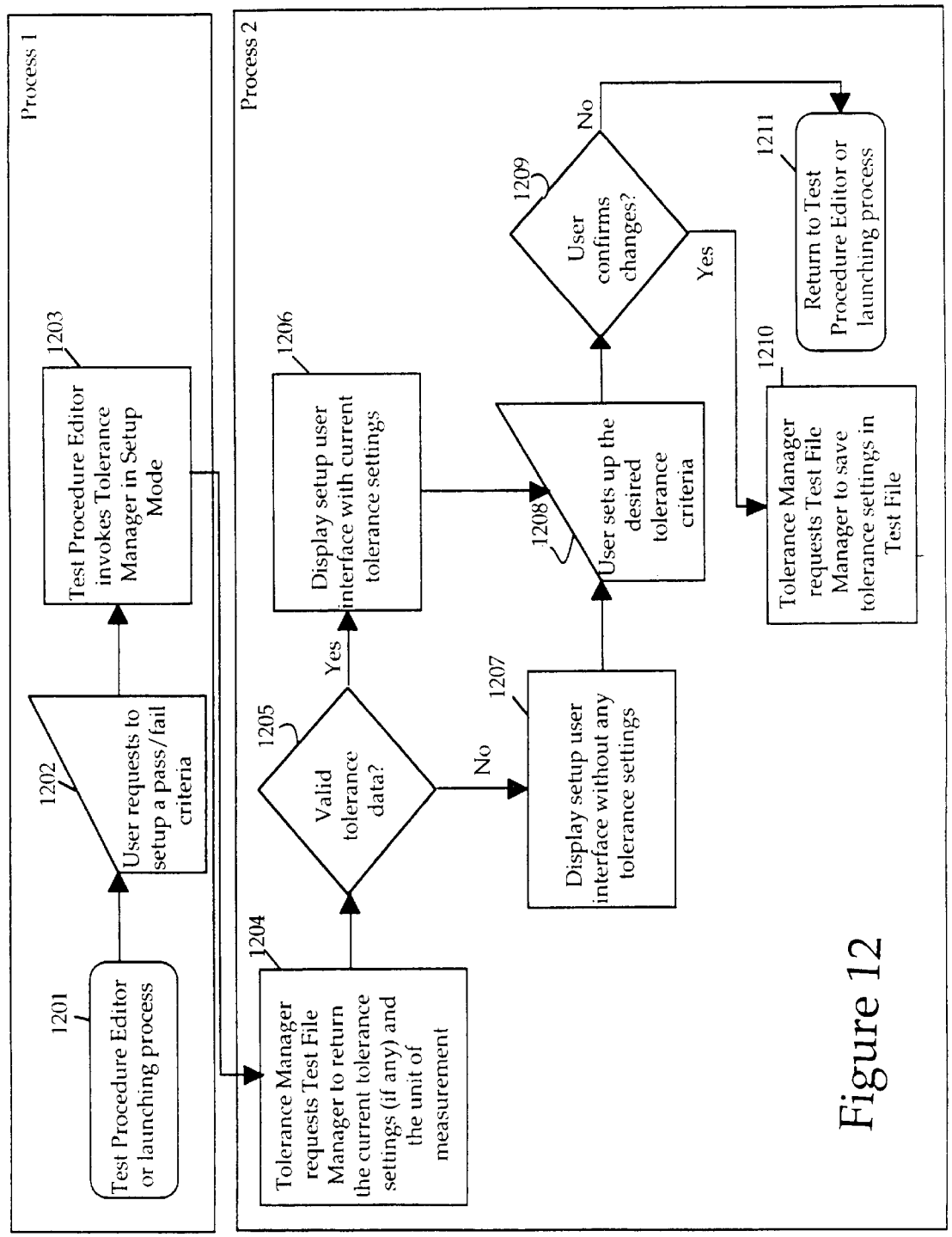
FIG. 12 is a process flow diagram illustrating the general steps followed by the tolerance manager during its setup mode.

FIG. 12 is a process flow diagram illustrating the general steps followed by the tolerance manager during its setup mode. In process one (1), tolerance manager (TM) 107 is initiated by test procedure editor (TPE) 105 or a launching process. For example, a user of the CBTOS requests to add or to modify the tolerance criteria for a specific step and TM 107 is invoked.

More specifically, in step 1201, the launching process of TPE 105 invokes TM 107. In step 1202, a user requests to set up a pass or a fail criteria using the previously illustrated set tolerance windows 800–1100. In step 1203, TPE 105 invokes TM 107 in setup mode 700.

In process two (2), TM 107 requests test file manager (TFM) 113 to return the currently defined tolerance settings from the test file. If the current test step includes valid tolerance data, TM 107 sets the set tolerance window's parameters to match the current tolerance criteria as specified in the test step using the currently defined tolerance settings obtained by TFM 113 from the test file. Otherwise, TM 107 displays a set tolerance window without tolerance data.

Once the user has finished setting up the tolerance criteria, TM 107 checks if the user has confirmed the setup and if so, TM 107 forwards the new tolerance criteria to TFM 113 to save the tolerance data in test file 115.

More specifically, in step 1204, TM 107 requests TFM 113 to return the current tolerance settings if they exist and return the unit of measurement used from the test file. In step 1205, if there is valid tolerance data, then in step 1206 a set tolerance window is displayed to the user with current tolerance settings. Otherwise, in step 1207, set tolerance window is displayed to the user without any tolerance settings.

In step 1208, the user sets up the desired tolerance criteria through the set tolerance window and in step 1209 confirms the changes made to the tolerance criteria. In step 1210, TM 107 requests TFM 113 to save the tolerance settings in test file 115. Finally in step 1211 the process is returned to test procedure editor (TPE) 105 or the launching process.

Figure 13:
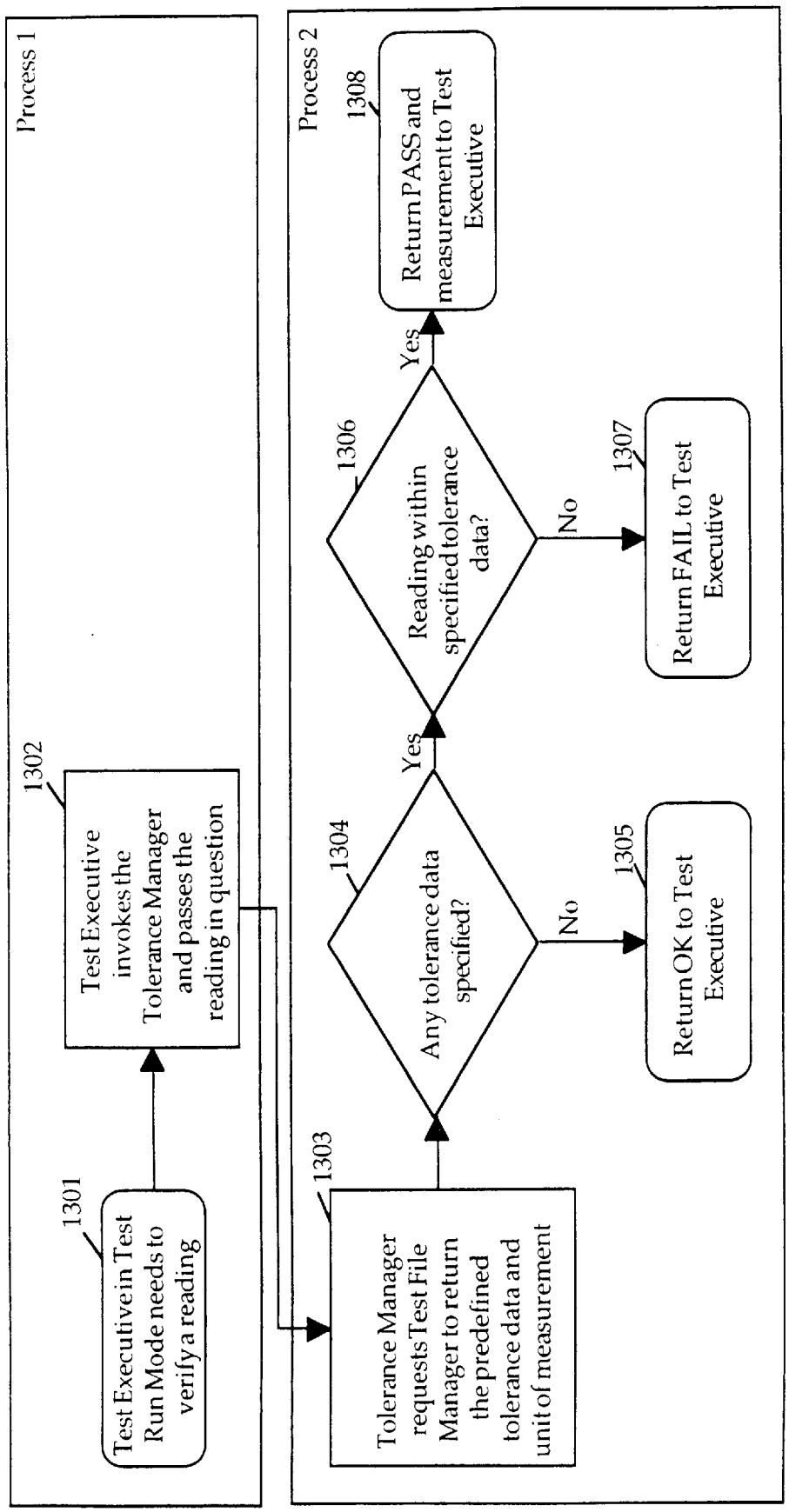
FIG. 13 illustrates an exemplary process flow of the tolerance manger's execute mode.

FIG. 13 illustrates an exemplary process flow of the tolerance manger's execute mode. In process one (1), test executive module (TEM) 111 is in test run mode 122. During the testing of a device, TEM 111 receives a reading or a measurement as the result of the testing of the device. TEM 111 then invokes tolerance manager (TM) 107 in its execute mode 130 to verify the returned reading with the pre-defined tolerance data if any pre-defined tolerance data exist. Thus, in step 1301, TEM 111 in test run mode verifies a returned reading. In step 1302, TEM 111 invokes TM 107 and passes the returned reading to TM 107.

In process two (2), in step 1303 TM 107 is in execute mode 710 and requests test file manager TFM 113 to return the pre-defined tolerance data in the unit of measurement for the current step from the test file. TM 107 then verifies that the tolerance data is valid, and proceeds to verify the reading with the predefined tolerance data. In step 1304, if no tolerance data is specified, then TM 107 returns "OK" to TEM 111 in step 1305. In block 1306, if the measurement is within a specified tolerance data, then in block 1308, a pass result along with the measurement is returned to TEM 111. Otherwise, in block 1307, a fail result is returned to TEM 111.

Test Procedure Editor

Figure 14A:
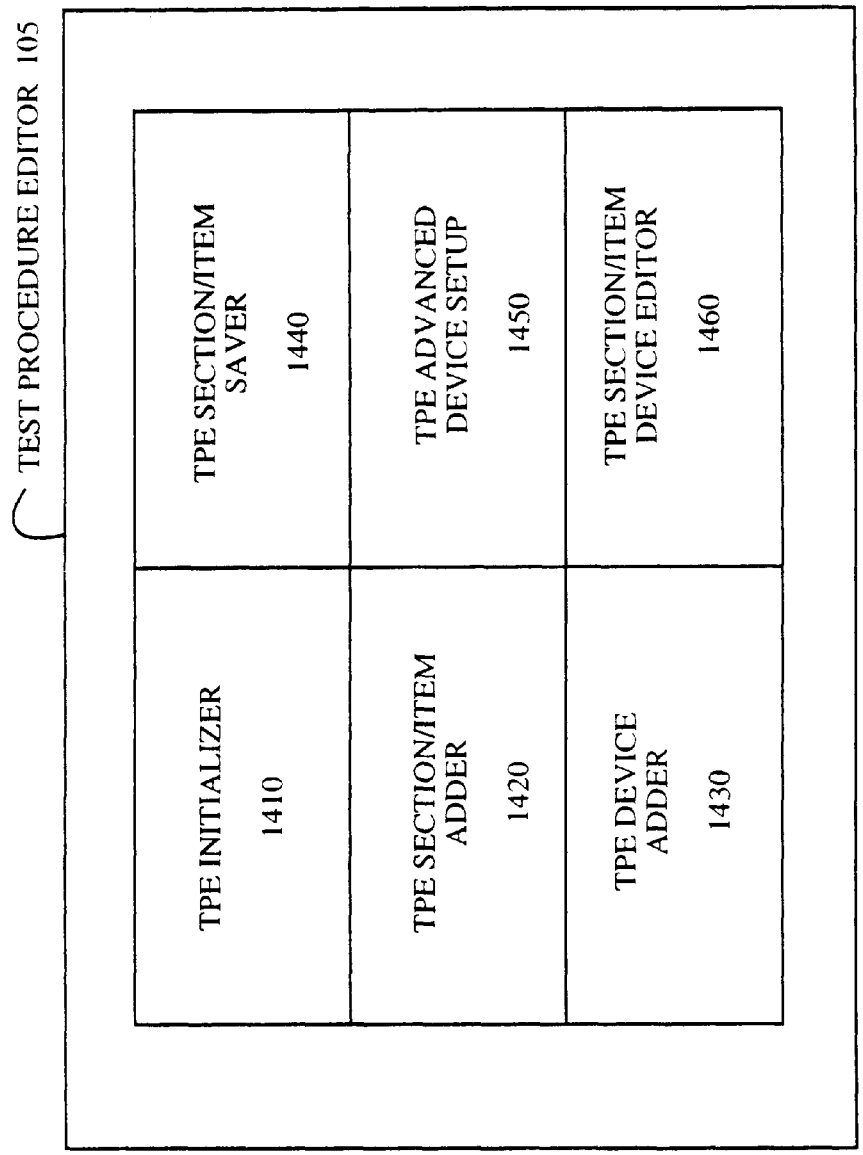
FIG. 14a illustrates the test procedure editor.

FIG. 14a illustrates the present invention's test procedure editor. Test procedure editor 105 has TPE initializer 1410, TPE section/item adder 1420, TPE device adder 1430, TPE section/item saver 1440, TPE advanced device setup 1450 and TPE section/item/device editor 1460. The various components of the test procedure editor allows the generation and editing of the test file containing information on how and with what instrument a UUT is to be tested. Each component is described in detail in the text accompanying FIGS. 16–21.

FIG. 14b illustrates the contents of a test file generated and maintained by the test procedure editor. Exemplary test file 1490 is a database which includes test step names 1491, unit of instrument/UUT measure 1492, instrument settings 1493 for testing, associated instrument and UUT test tolerances 1494 and advanced device setup values 1495.

Figure 14C:
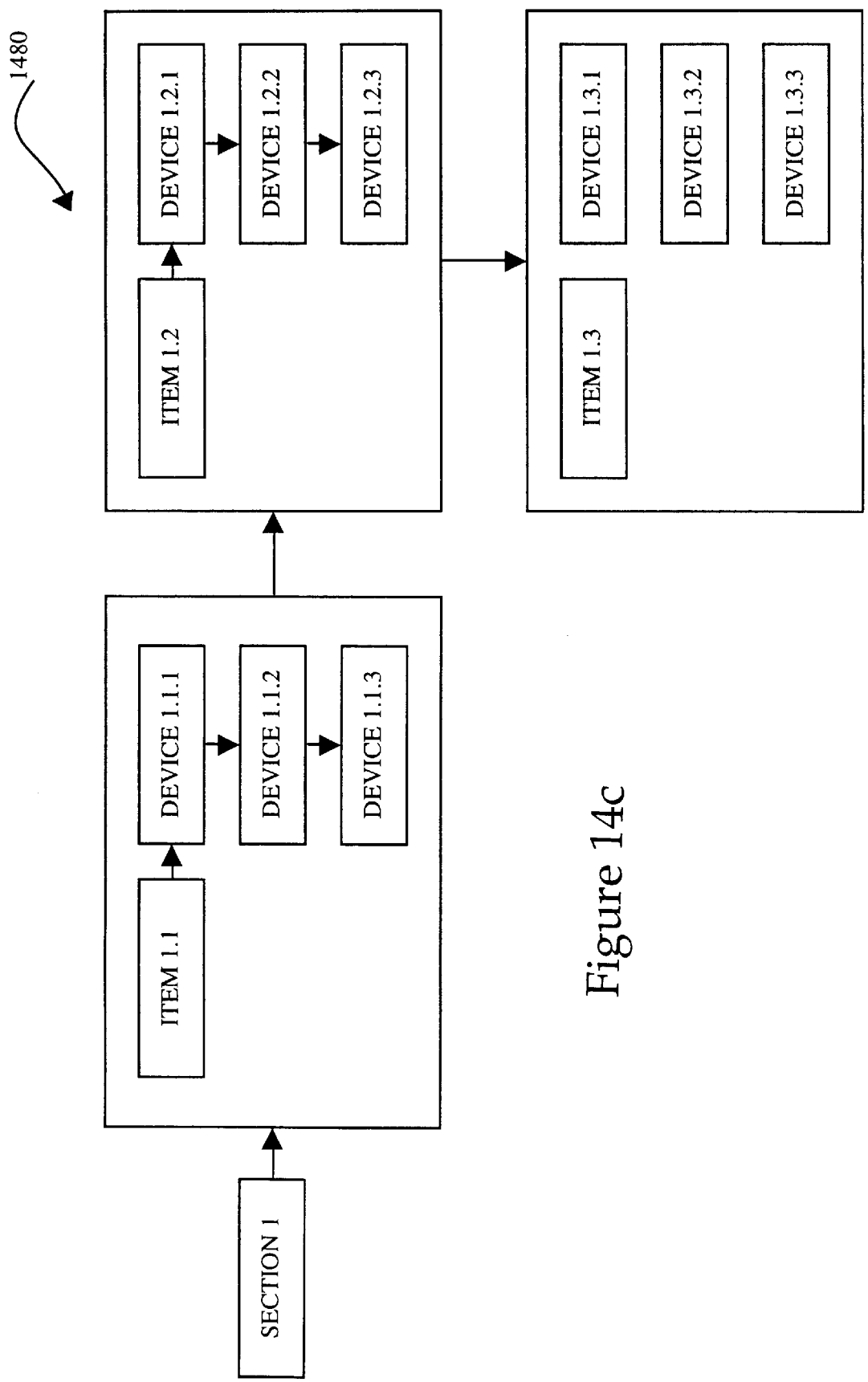
FIG. 14c illustrates the three-level hierarchy of the present invention's test procedure editor (TPE).

FIG. 14c illustrates the three-level hierarchy of test steps contained in the test file and maintained by the test procedure editor.

The TPE 105 of the present invention is based upon a three-level hierarchy. One level is a sectional level in which a group of test items that tests a major feature of the UUT. Sections denote major categories and represent the highest level of the test hierarchy of TPE 105. An example of a section entry is "audio output testing." There may be several sections per a test file.

The item level includes a group of test steps or devices which perform a test. An example of an item entry is "channel one audio output level". There may be several items per section and each item has an associated note entry which may be used for any purpose.

Finally, there is a device level which includes a test item that performs a task on a physical device or a software object. For example, a set-up HP 8903B audio analyzer™ to measure signal level by Hewlett Packard®. There may be several devices per item.

In the illustrated flow of test sequence 1480, devices under section 1, item 1, are executed first in order from top to bottom. Then the devices under section 1, item 2 are executed followed by section 1, item 3 and so on until all items under section 1 are executed. After the items under section 1 are executed, the items under section 2 are executed followed by section 3 and so on until all sections in the test sequence are executed.

Figure 15A:
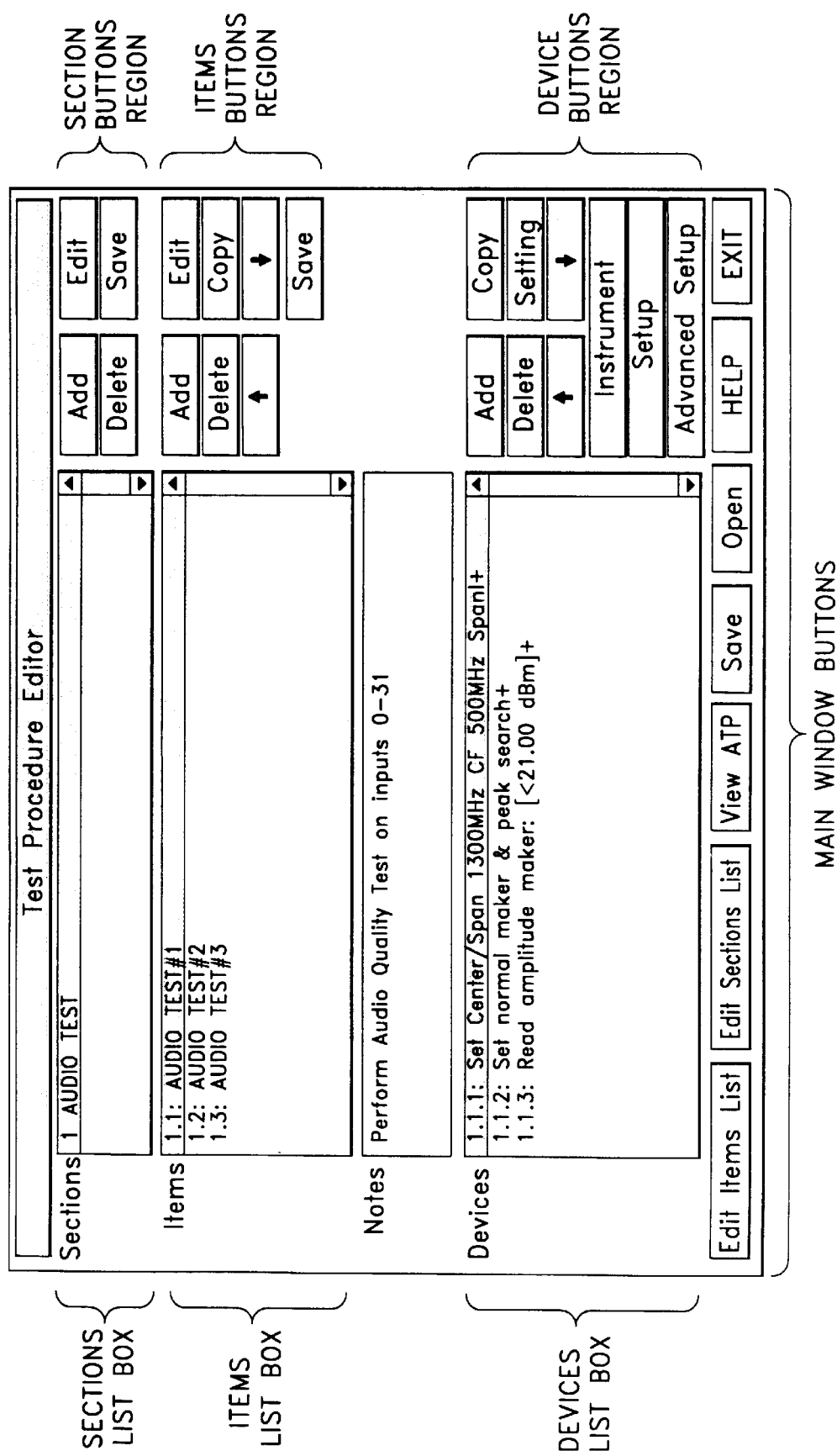
FIG. 15a illustrates a test procedure editor window which allows a user to view the test procedure and to generate and enter edit test steps while testing a UUT.

FIG. 15a illustrates a test procedure editor window 1500 which allows a user to view the test file and to edit test steps for testing a UUT.

FIG. 15b illustrates the test procedure editor window 1500 of FIG. 15a with sample data.

Figure 15C:
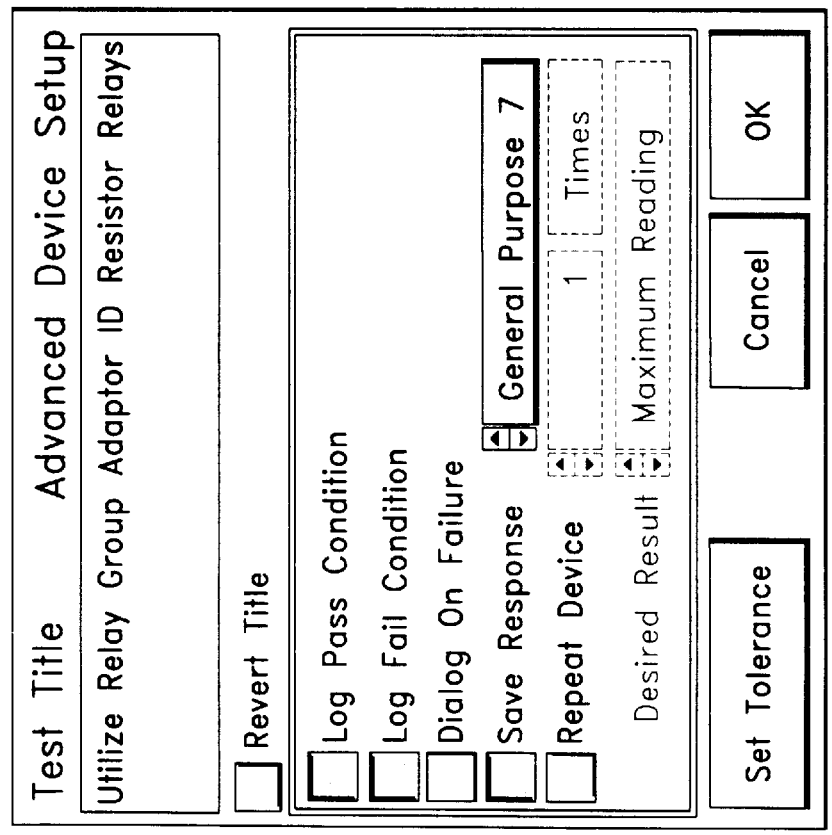
FIG. 15c illustrates the test procedure editor's advanced setup window with sample values.

FIG. 15c illustrates the test procedure editor's advanced setup window 1510 with sample values.

Figure 16:
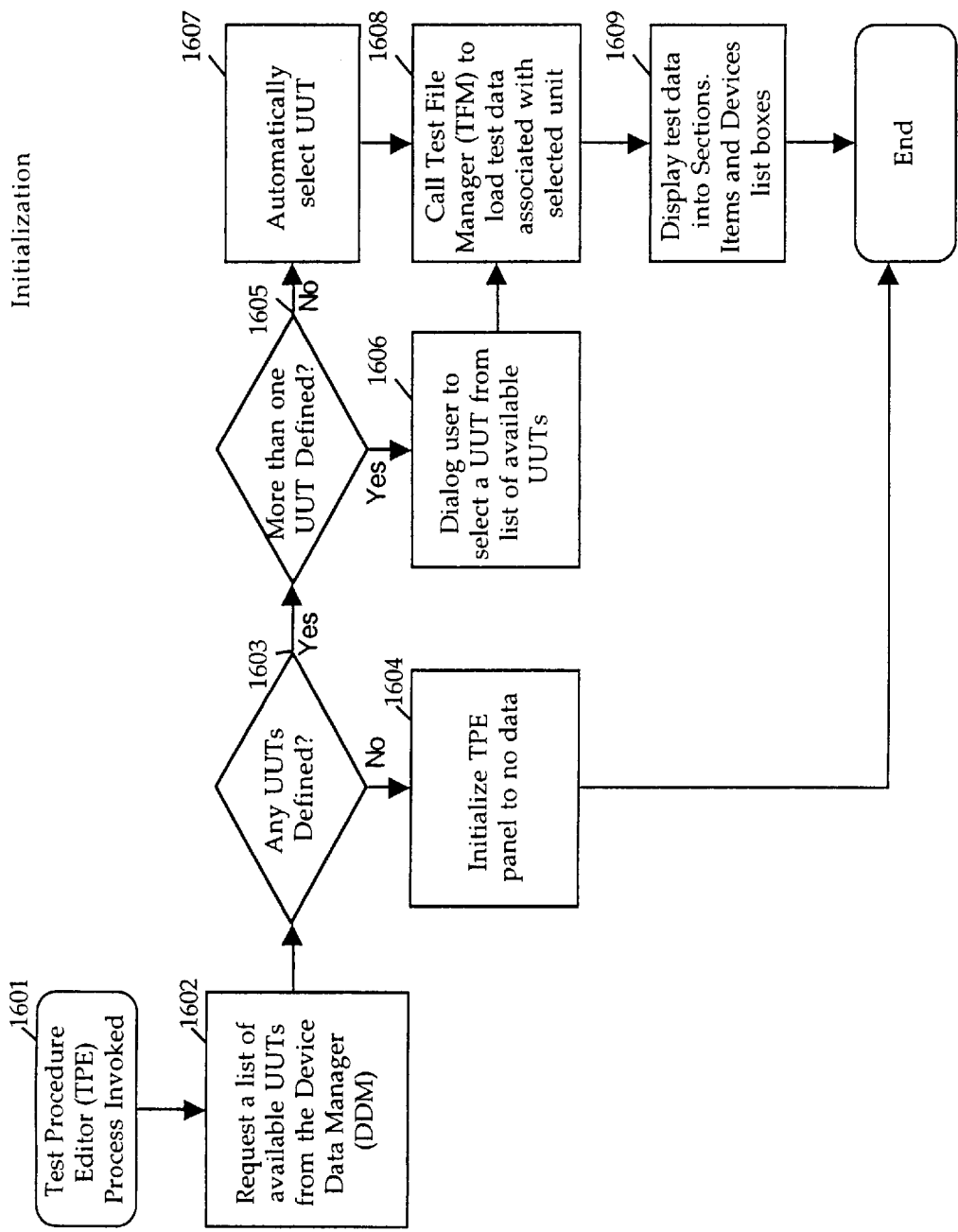
FIG. 16 is a flow diagram illustrating the general steps followed by the test procedure editor during its initialization process.

FIG. 16 is a flow diagram illustrating the general steps followed by the test procedure editor during its initialization process. Once TPE 105 is invoked in step 1601, TPE 105 calls device data manager (DDM) 109 to retrieve the names of the defined UUT's in step 1602. TPE 105 is dependent on DDM 109 which specifies available UUT's, instruments and devices that may be used with each UUT, relative paths to the test file for each UUT and to the selected instrument and device setup modules.

In step 1603, it is determined if UUT's are defined and if there are no UUT's defined, the TPE window is initialized to no data in step 1604. If there are UUT's defined, then in step 1605, if there are more than one UUT defined, then in step 1606 the user is prompted to select a UUT from a list of available UUT's. Otherwise if there is only one UUT defined, then in step 1607, that UUT is automatically selected. Once selected, TPE 105 calls test file manager (TFM) 113 to open and load the test file data for the selected UUT in step 1608. In step 1609, TPE 105 concludes its initialization process by displaying the test file data in the sections, items and device list boxes.

Figure 17:
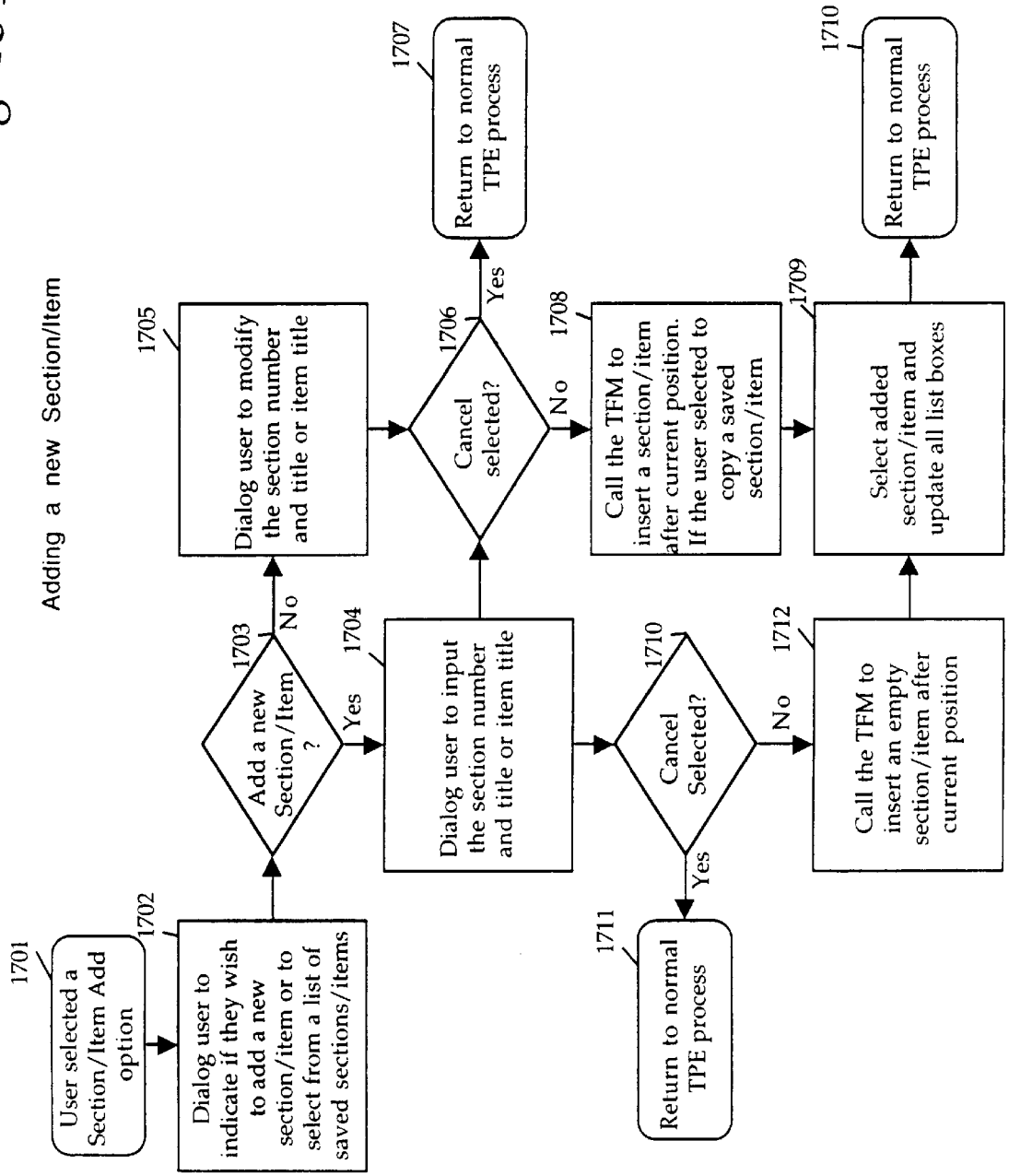
FIG. 17 is a flow diagram illustrating the general steps followed by the test procedure editor in adding a new section or item to its test file.

FIG. 17 is a flow diagram illustrating the general steps followed by TPE 105 in adding a new section or item to its test file. In step 1701, once a user selects to add a new section or item, TPE 105 dialogs the user to select if they wish to add a new section or an item or to copy a previously saved section or an item in step 1702. In step 1703, once the user selects to add a new section or an item, in step 1704 a second dialog allows user to input the desired section number and title for the added section or the title of the added item in step 1704. Otherwise if the user indicates that they do not want to add a new section or an item, then in step 1705, TPE 105 dialogs the user to modify the section number and title or item title.

If the user selects to cancel the process in steps 1706 or 1710, then the process is canceled and returned to normal TPE processing in steps 1707 and 1711. Otherwise if a new section or item has been added, then in step 1712 TFM 117 is called to insert an empty section or item after the currently indicated position in the list of sections and items. If the user select, to copy a previously saved section or an item instead of adding a new section or an item, then in step 1708 TFM 105 is called and a section or an item is inserted after the current position. In step 1709, the added sections or items are selected and all list boxes as displayed on the TPE window to the user are updated. In step 1710, the process is returned to normal TPE processing.

Figure 18:
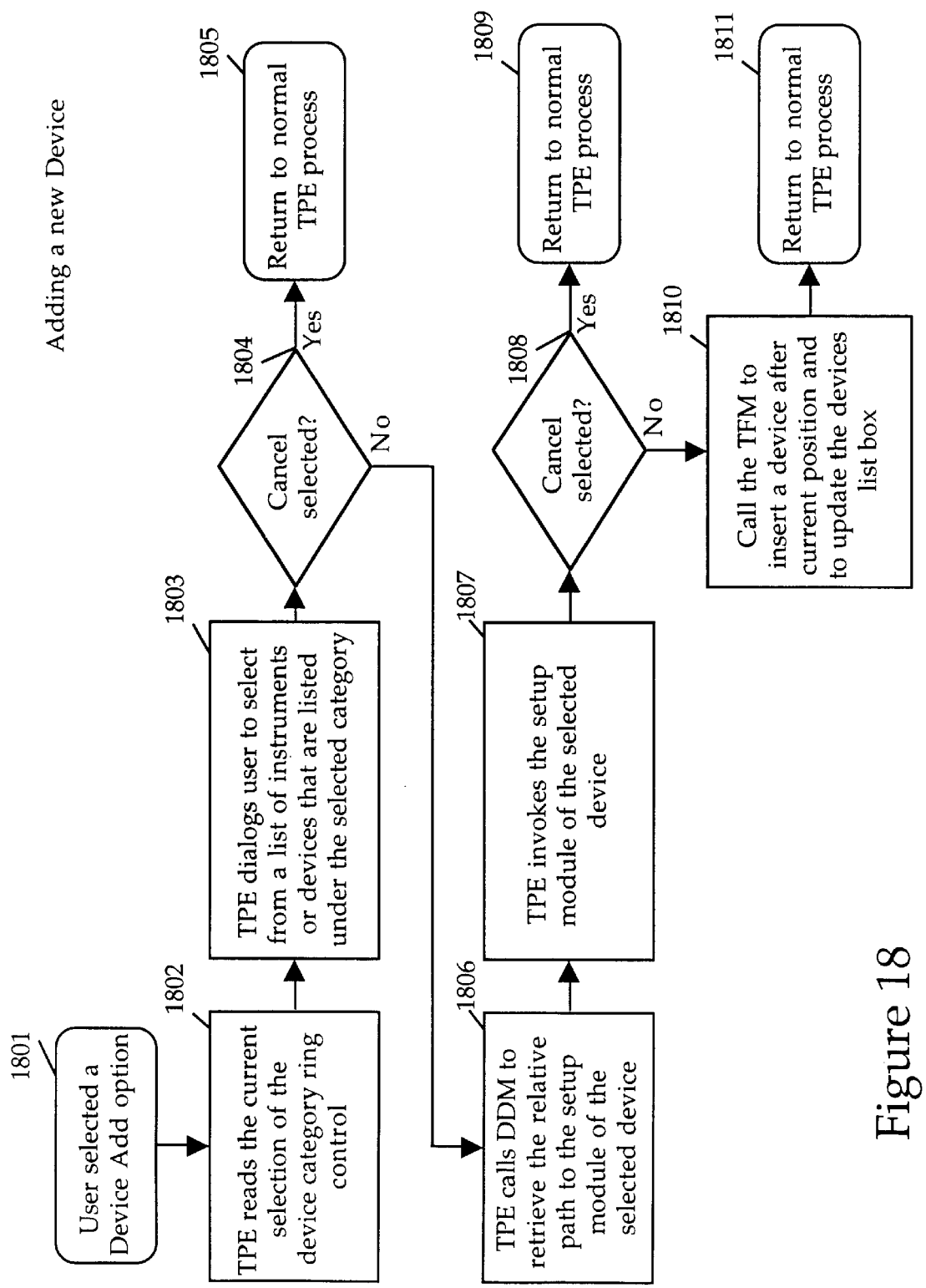
FIG. 18 is a flow diagram illustrating the general steps followed by the test procedure editor in adding a new device to the test file.

FIG. 18 is a flow diagram illustrating the general steps followed by the test procedure editor (TPE) in adding a new device to the test file. Prior to the user action to add a new device, the user must specify the device category on the provided ring control. Once the user selects to add a new device, TPE 105 calls device data manager (DDM) 109 to provide all the available devices associated with the selected category. The TPE then dialogs the user to select a specific device from a list of available devices listed on the TPE window. Once the user makes a selection and confirms the action, TPE 105 retrieves the relative path to the selected device from DDM 109 and invokes the setup module for the selected device. If the user confirms the device setup, TPE 105 calls the test file manager (TFM) 113 to insert the new device using the settings made on the device's setup module. TPE 105 then updates its display on the TPE window accordingly.

More specifically, in step 1801, a user selects a device add option. In step 1802, TPE 105 then reads the current selection of the device category ring control. In step 1803, TPE 105 dialogs user to select from a list of instruments or devices which are listed under the selected category. In step 1804, if a cancel option is selected by the user indicating a desire to cancel adding a device to the test file, then in step 1805, the process is returned to normal TPE processing. Otherwise, in step 1806, TPE 105 calls DDM 109 to retrive the relative path to the setup module of the selected device. In step 1807, TPE 105 invokes the setup module of the selected device. In step 1808, if the user selects the cancel option, then in step 1809 the process is returned to normal TPE processing. Otherwise, in step 1810, TPE 105 calls TFM 113 to insert a device after the current position in the list and to update the device list box displayed on the TPE window. In step 1811, the process is returned to normal TPE processing.

Figure 19:
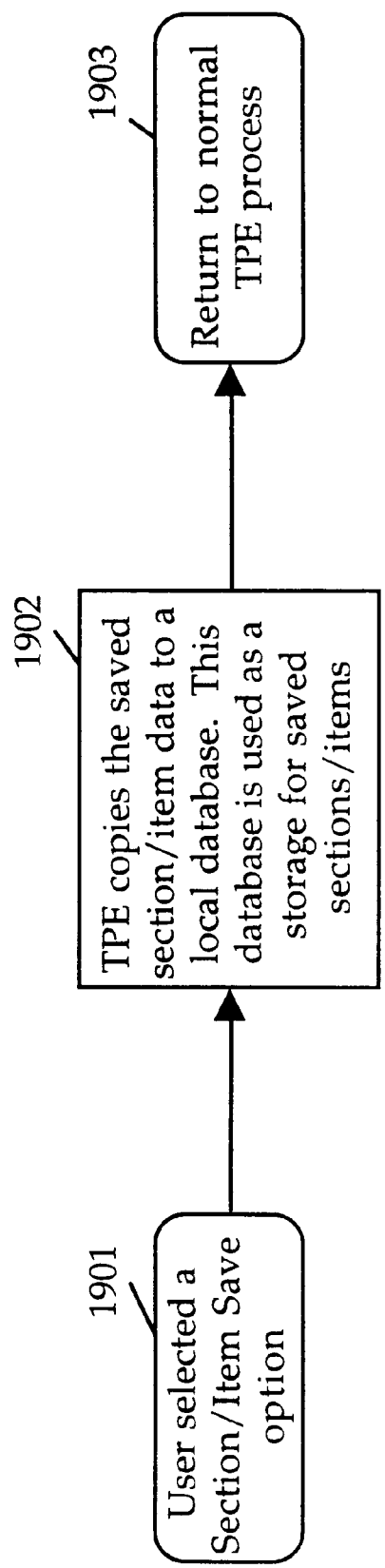
FIG. 19 is a flow diagram illustrating the general steps followed by the test procedure editor in saving a section or an item for future use.

In FIG. 19, a flow diagram illustrating the general steps followed by the test procedure editor (TPE) in saving a section or an item for future use is illustrated. Once the user selects the currently selected section or item, TPE 105 adds a section or an item entry to a local database. The database is used to store the same sections or items. The saved sections or items may be retrieved by the user by selecting from one of the saved sections or items when requesting to add a new section or an item.

More specifically, in step 1901, a user selects a section or an item save option displayed on the TPE window. In step 1902, TPE 105 copies the saved section or item entry to a local database. Finally, in step 1903, the process is returned to normal TPE processing.

Figure 20:
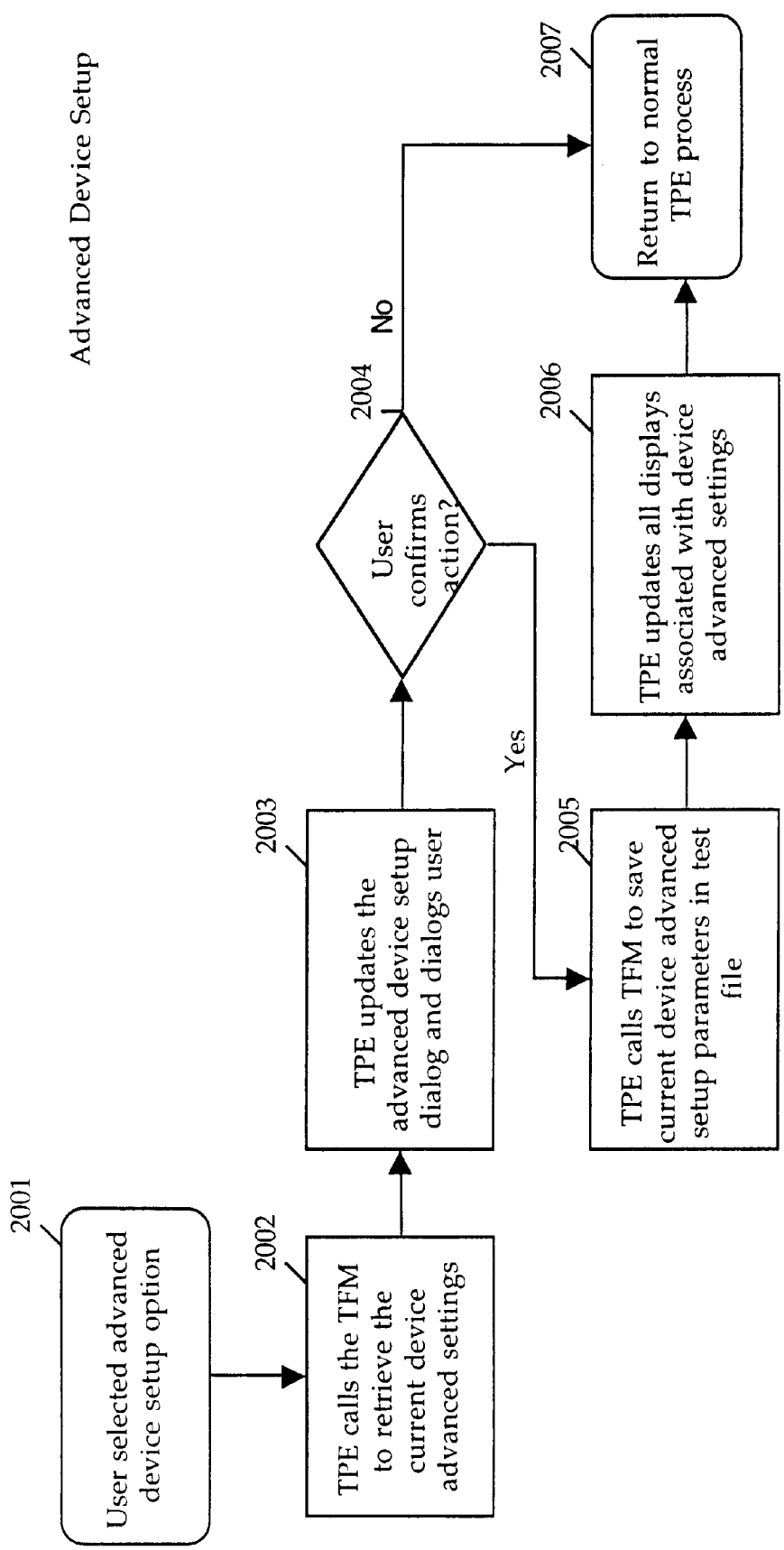
FIG. 20 is a flow diagram illustrating the general steps followed by the test procedure editor when its advanced device setup option is initiated.

FIG. 20 is a flow diagram illustrating the general steps followed by the test procedure editor (TPE) when the TPE's advanced device setup option is initiated. The user may select the advanced device setup option from the TPE window to control how the test executive module behaves when executing the selected device. Some options which may also be selected by the user under the advanced device setup process is as follows: edit the title of the current device as it appears on the TPE device list, log results in a data sheet if the results of the test is a pass or an "OK", log the result in a data sheet if the result is a fail, dialog (continue, abort, repeat or debug) the user if the result is a fail, repeat the execution of the current test for a number of times or for a duration of time during the testing process, save the result as a reference value and/or setup or modify the tolerance data used for testing the device.

Once the user selects to edit the device advanced setup parameters, TPE 105 calls TFM 113 to retrieve the current device advanced setup parameters from the test file. TPE 105 then dialogs the user to modify the current devices advanced setup parameters. Once the user confirms the action, TPE 105 calls TFM 113 to save the new advanced device setup parameters in the test file and updates all displays associated with the devices advanced setup parameters.

More specifically, in step 2001, a user selects an advanced device setup option off of the options displayed on the TPE window. In step 2002, TPE 105 calls TFM 113 to retrieve the current device advanced settings. In step 2003, TPE 105 updates the advanced device setup dialog and dialogs the user accordingly. In step 2004, if the user confirms the action, then in step 2005 TPE 105 calls TFM 113 to save current device advanced setup parameters in the test file. In step 2006, TPE 105 updates all displays associated with the device advanced settings. Finally, in step 2007, the process is returned to normal TPE processing.

Figure 21:
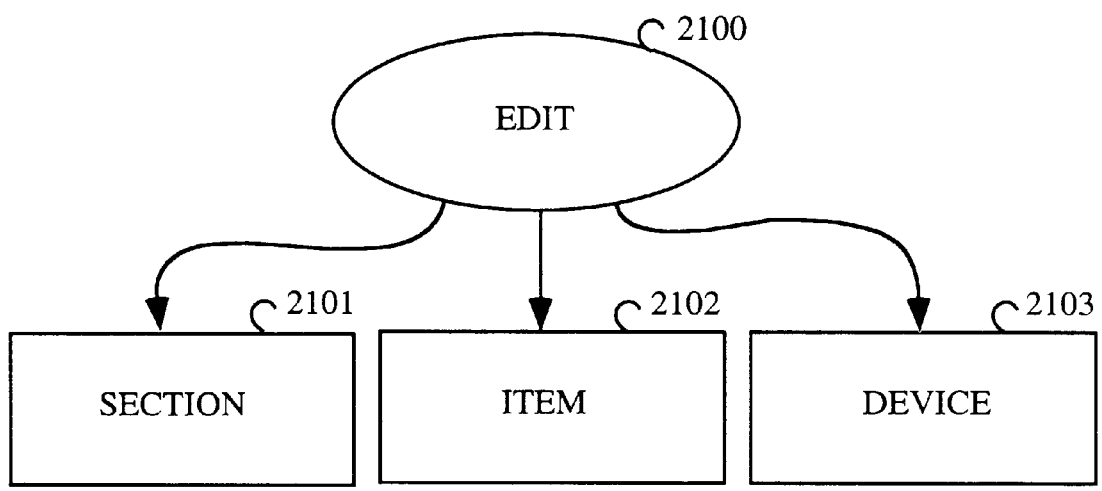
FIG. 21 is a process flow illustrating the general steps followed by the test procedure editor in editing a section, an item or a device.

FIG. 21 is a process flow illustrating the general steps followed by the test procedure editor (TPE) in editing a section, an item or a device. In step 2100, a user desires to edit a section, an item or a device in TPE window 1500. In step 2101, the user may edit the selected section for section number string or identifier and may also edit the selected section for a section's title string. Additionally, in step 2102, a user may edit the selected item for the item title string and/or the item note string. Finally, in step 2102, a user may edit the selected device for a device category, selected device within selected category and/or device setup parameters by calling associated device setup module routine.

Device Data Manager (DDM)

Figure 22A:
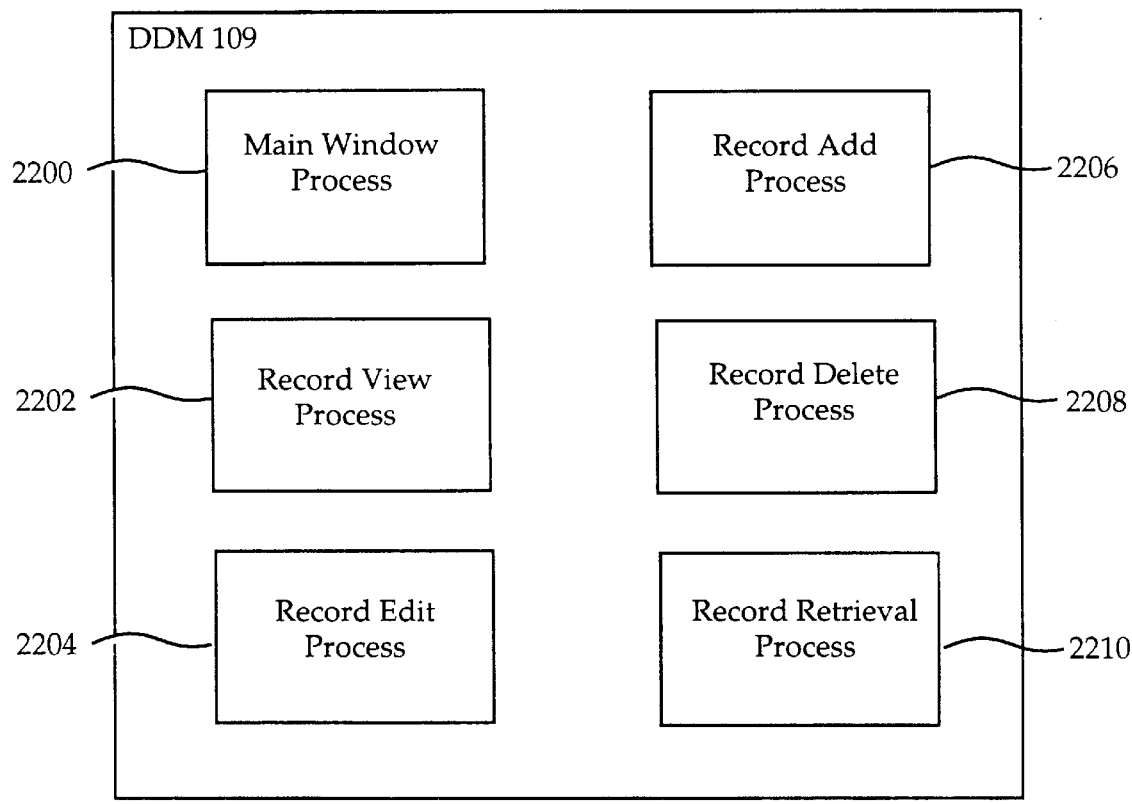
FIG. 22a illustrates the device data manager (DDM) of the present invention.

FIG. 22a illustrates the CBTOS device data manager of the present invention. DDM 109 has a main window process 2200, a record view process 2202, a record edit process 2204, a record add process 2206, a record delete process 2208 and a record retrieval process 2210. Each process supports various modifications to the device data database which the DDM is in charge of maintaining. A detailed description of each components of the DDM is described in the following text.

FIG. 22b illustrates the contents of the device data database. The device data database includes the following: a UUT name 2220, a UUT part number 2222, test file path 2224, test adapter identification resistor value 2226, serial number format string 2228, instrument name 2230, path to instrument interface module 2232, path to instrument set-up module 2234, plug-in card name 2236, path to plug-in interface module 2238 and path to plug-in setup module 2240.

A UUT part number is a field which defines the UUT part number (e.g. 980-9900-001). Since the UUT may have more than one configuration and hence, more than one part number, the database is set up to accept multiple UUT part numbers associated to a single UUT name.

The test file path is a string defining the relative path to the test file. There is a test file path for each UUT part number entry. The test adapter identification resistor value is a numerical value which defines the expected resistor value for the test cable for each UUT part number. This is a safety item to insure that the correct test adapter is connected to the test system before the test executive module allows the test to proceed. The serial number format string is a formatted string which allows the test executive module to properly format the user inputs to that stored in the UUT for comparison.

The instrument name is a field which defines the instruments to be used with the identified UUT. Since more than one instrument may be used in testing a particular UUT, the database is setup to accept multiple instrument name entries. The path to instrument interface module is a string defining the relative path to the IIM to be used with the UUT. The path to instrument setup module is a string defining the relative path to the instrument setup used for initializing and/or testing the instrument.

The device name is a field which defines a system or miscellaneous device to be used with all identified UUT's. A device is a software module which performs a test related action such as communication with an instrument or verification of contents of a given variable. Since more than one device may be used in testing a particular UUT, the database is setup to accept multiple device name entries. The path to device interface module is a string defining the relative path to the device interface module to be used with all UUT's. The present invention's device data manager (DDM) is required to create, edit and manage the contents of the device data database.

Figure 23:
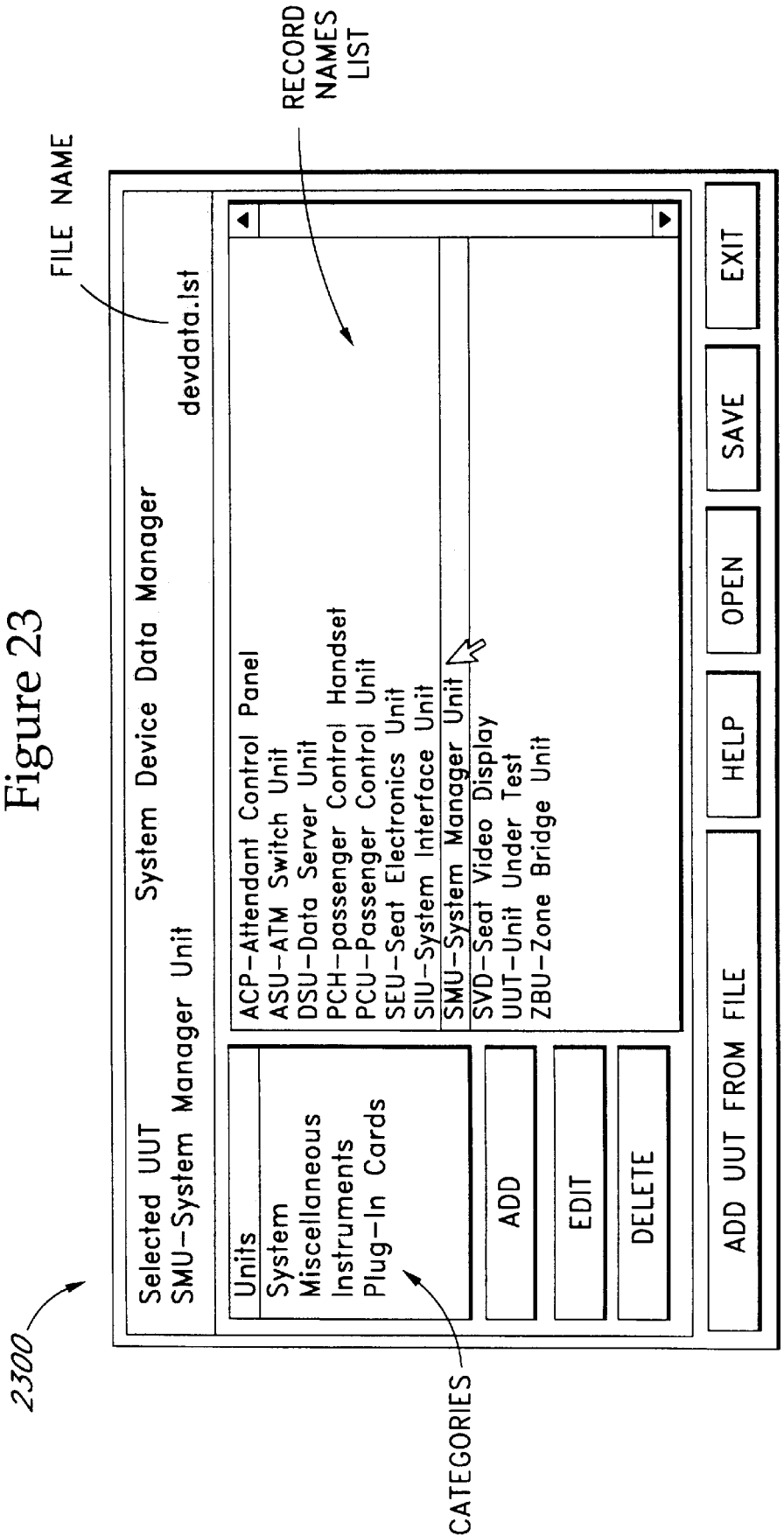
FIG. 23 illustrates an exemplary system device data manager window.

FIG. 23 illustrates an exemplary system device data manager (DDM) window. The device data manager window 2300 allows the user to view the stored records in the device data database. Record manipulation buttons ADD, EDIT and DELETE allow the user to perform the desired operation on the selected item as will be discussed below.

Figure 24:
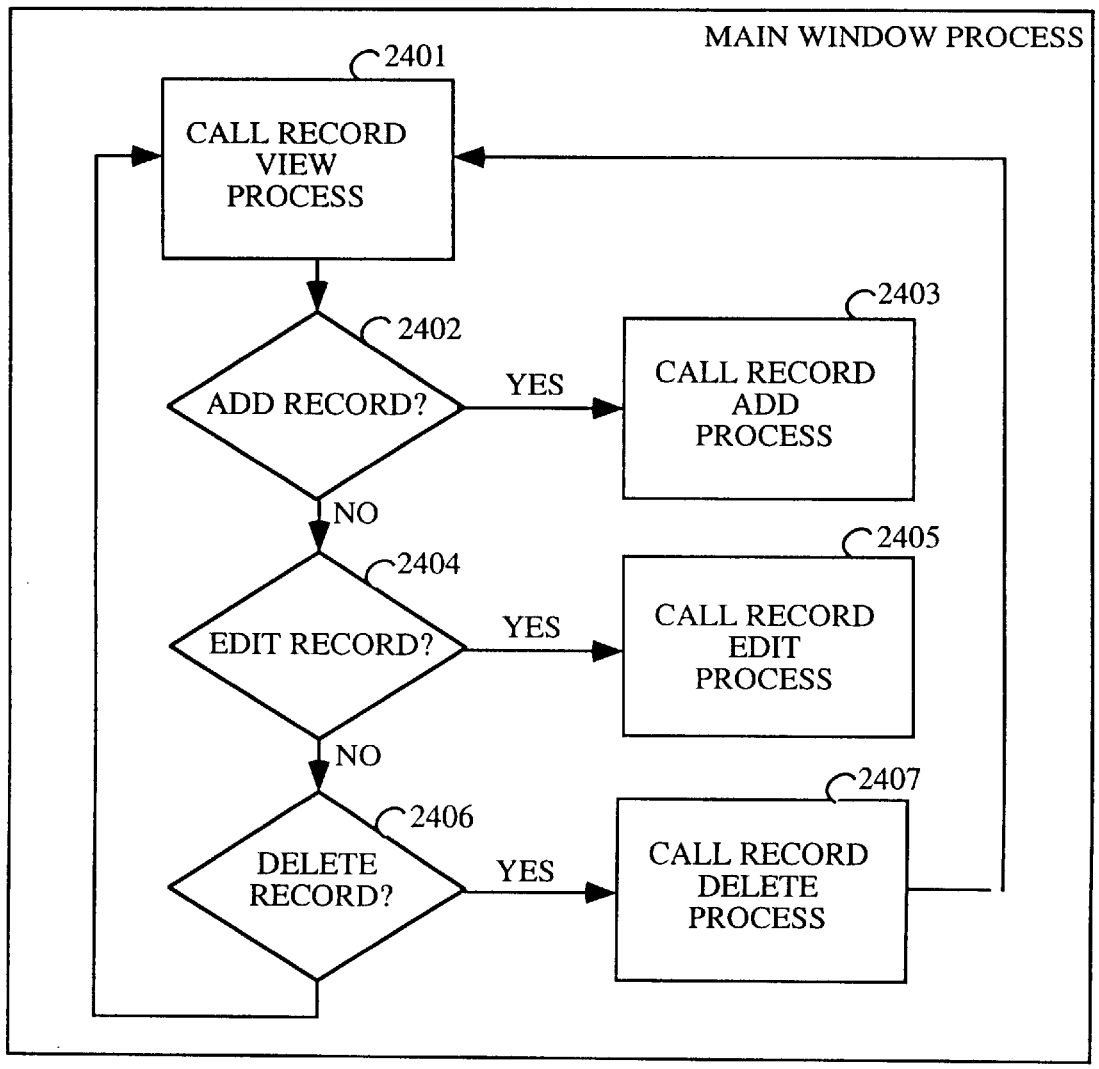
FIG. 24 is a process flow diagram for the device data manager's device data management process.

FIG. 24 is a process flow diagram for the DDM's device data management process. DDM 109 continuously checks for user inputs and updates the device record list accordingly. In step 2401, the record view process of DDM 109 is initiated. In step 2402, if a record is to be added, then in step 2403, the record add process is called. Otherwise, if a record is to be edited in step 2404, in step 2405 the record edit process is called. Finally, in step 2406, if a record is to be deleted then, in step 2407 the record delete process is called. Each of the processes called, namely the record view process, the record add process, the record edit process and the record delete processes are described in more detail in the description that follows.

Figure 25:
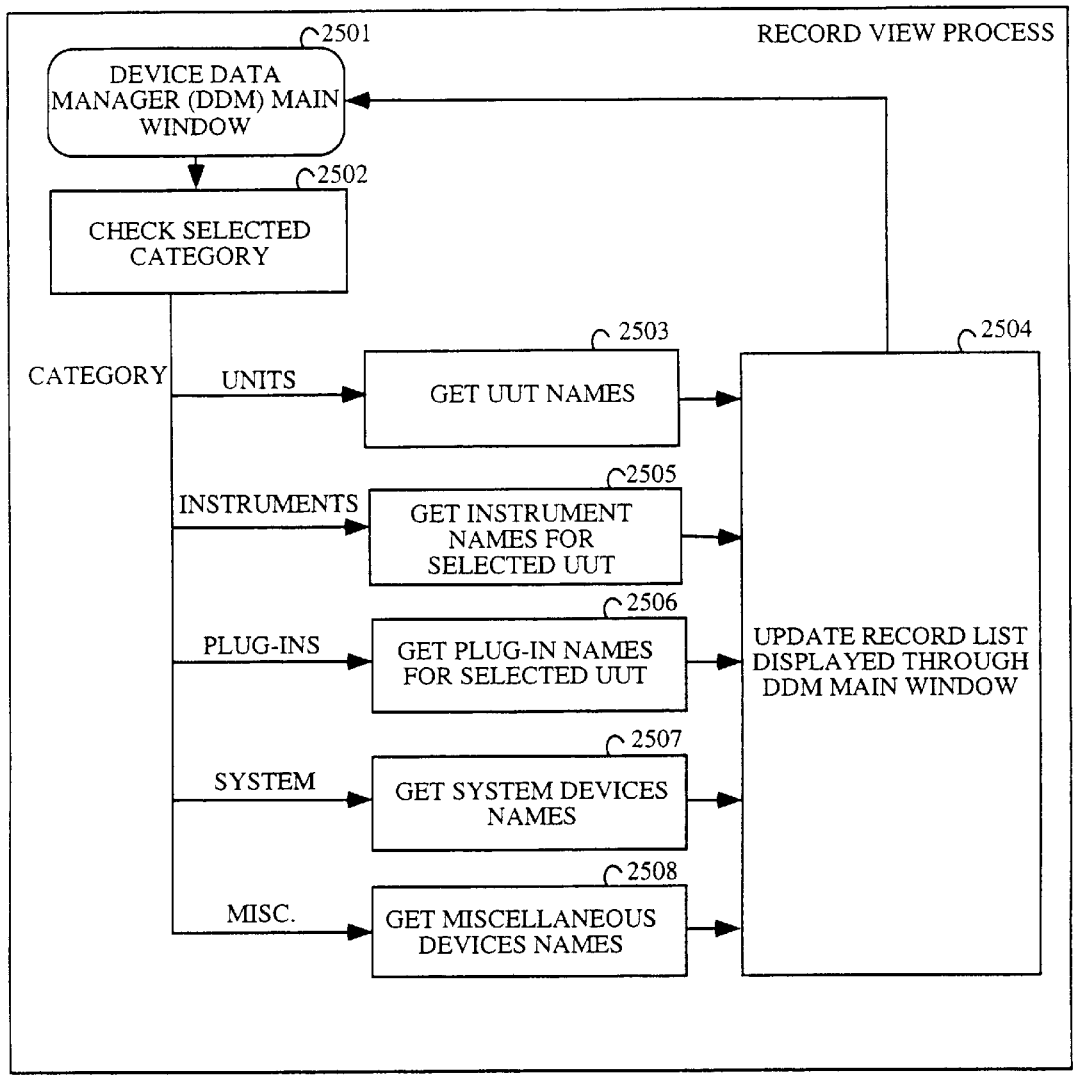
FIG. 25 is a process flow diagram for the device data manager to view stored records for a selected category.

FIG. 25 is a process flow diagram for the DDM to view stored records for a selected category. While the DDM is running the main window, the DDM is continuously running the record view process. The record view process checks for the category list to identify the selected category. The record view process then retrieves the name fields of the records for the selected category and updates the record list window with the retrieved record names.

In step 2501, the process begins with the DDM main window process. In step 2502, the user selects the category and the record view process checks the selected category. If the selected category is units, then in step 2503, the UUT names are retrieved from the device data database and in step 2504, the record list displayed on the main window is updated with the UUT names. If the category selected by the user is instruments, then in step 2505, instrument names are retrieved for the selected UUT from the device data database and in step 2504, the record list displayed on the main window is update with the instrument information. If the category selected by the user is plug-ins, then in step 2506, plug-in names are retrieved for selected UUT from the device data database and in step 2504 the record list displayed in the main window is updated. If the category selected is system, then in step 2507, the system device names are retrieved from the device data database and in step 2504, the record list on the main window is again updated. Finally if the category selected is miscellaneous, then in step 2508 miscellaneous device names are retrieved from the device data database and in step 2504, the record list is updated.

Figure 26:
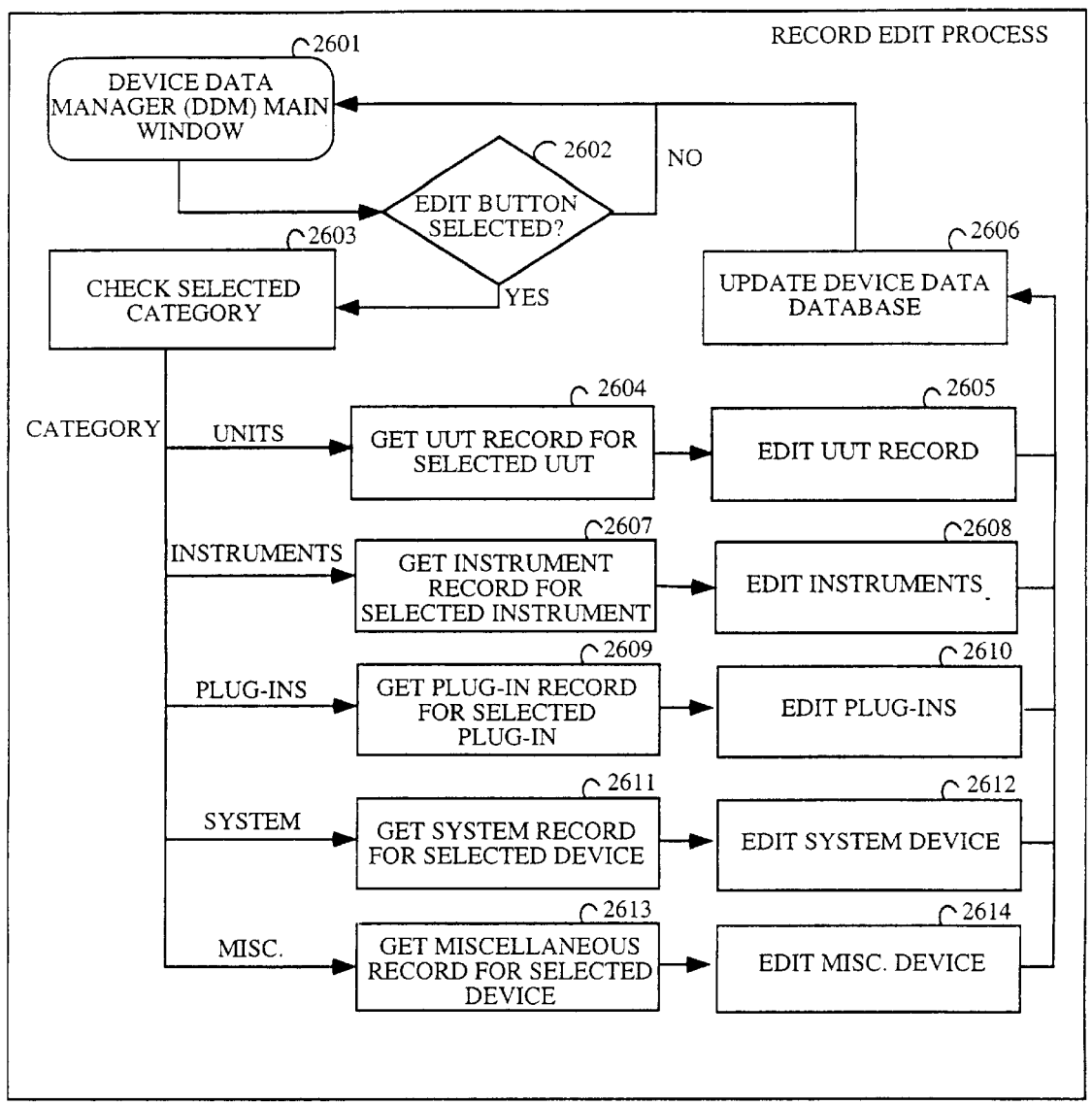
FIG. 26 is a process flow for editing a selected record using the present invention's device data manager.

FIG. 26 is a process flow for editing a selected record using the present invention's DDM. Once the user selects the EDIT button on the main window, the main window process launches the record edit process passing parameters indicating the selected category and the selected record name. The record edit process retrieves the data pertinent to the selected record. Edit process also displays the retrieved record to the user. The user is then free to make changes to the record. Once the user confirms the changes, the record edit process updates the device data database based on the new user inputs. The process then terminates and the main window process resumes.

In step 2601, the DDM main window is displayed to the user. In step 2602, if the user presses the edit button, then in step 2603, the category selected by the user is noted. If the category selected is units, then in step 2604, the UUT record for selected UUT is retrieved from the device data database and in step 2605, the UUT record is edited by the user through the DDM input window. Then in step 2606, the device data database is updated. If the category selected is instruments, then in step 2607, the instrument record for the selected instrument is retrieved from the device data database and in step 2608, the instrument record is edited by the user through the DDM input window. In step 2606, the device data database is updated according; to the edits made by the user. If the category is plug-ins, then in step 2609, the plug-in record for selected plug-in is retrieved from the device data database and in step 2610, the plug-ins record is edited by the user through the DDM input window. In step 2606, the device data database is updated with the edits made by the user to that category. If the category is system, then the system record for the selected device is retrieved from the device data database in step 2611 and the system device record is edited by the user through the DDM input window in 2612. In step 2606, the device data database is then updated with the edits made to that category by the user. Finally, if the category selected is miscellaneous, then in step 2613, the miscellaneous record for the selected device is retrieved from the device data database and in step 2614, the miscellaneous device record is edited by the user through the DDN input window. In step 2606, the device data database is then updated reflecting the edits made to the miscellaneous category by the user.

Figure 27:
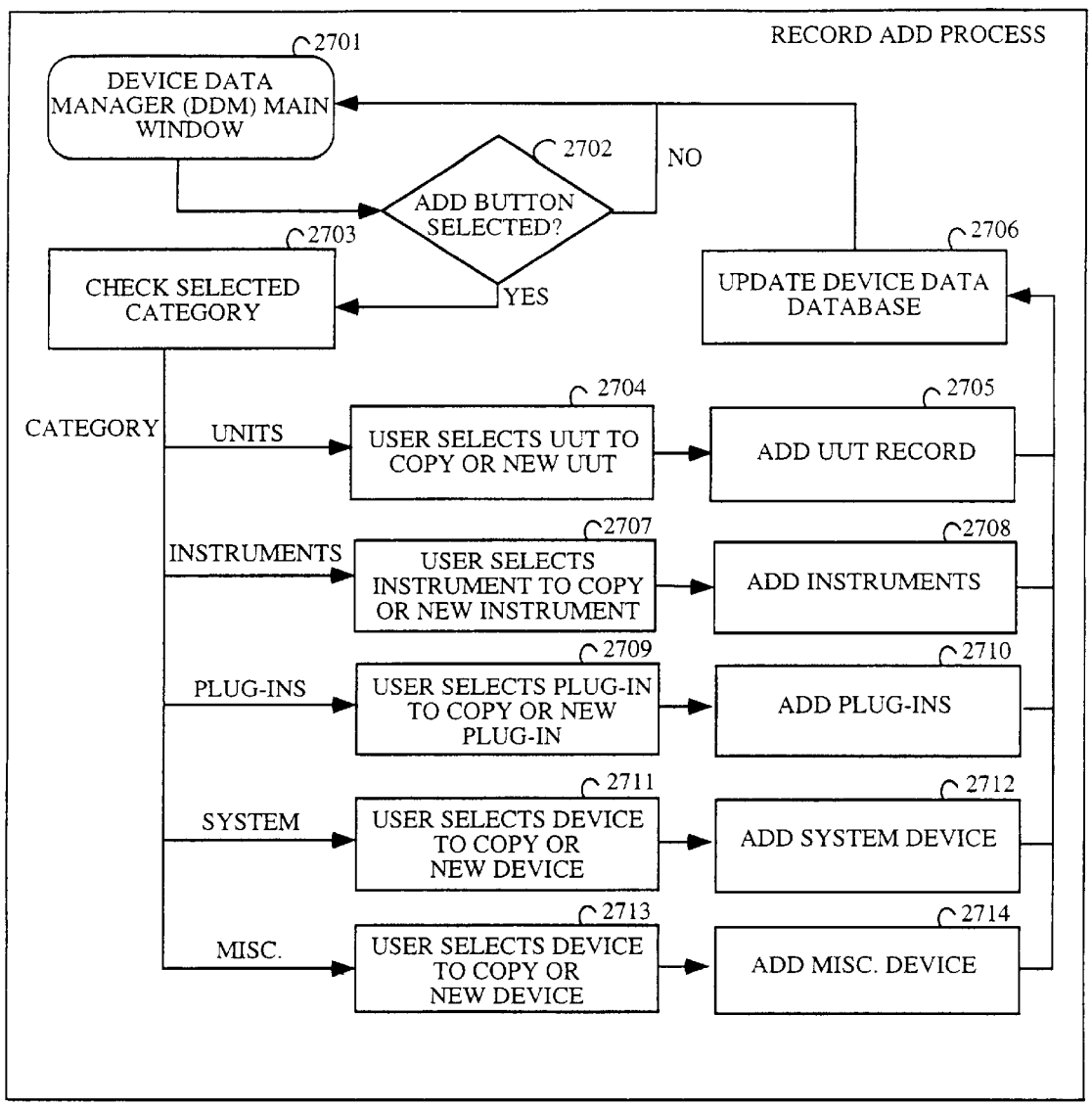
FIG. 27 is a process flow for adding a new record or copying an existing record using the present invention's device data manager.

FIG. 27 is a process flow for adding a new record or copying an existing record using the present invention's DDM. Once the user selects the ADD button on the main window, the main window process launches the record add process passing parameters indicating the selected category. The record add process allows the user to either add a new record or copy a previously stored record for the same category. The record add process then launches the applicable record editor process passing no parameters (i.e. all the fields empty) or passing parameters for the record the user chose to copy. The user is then free to make changes to the record. Once the user confirms the changes, the record add process updates the device data database based on the new user inputs. Finally the process terminates and the main window process resumes. In step 2701, the DDM main window is displayed to the user and if the user selects the ADD button in step 2702, then in step 2703 the category selected by the user for making additions is noted. If the category selected by the user is units, then in step 2704 the user selects UUT to copy a new UUT and in step 2705, the UUT record is opened. The device data database is then updated accordingly in step 2706. If the category selected by the user is instruments then the user selects instrument to copy a new instrument in step 2707. In step 2708, the instruments record is opened and in step 2706, the device data database is updated accordingly.

If the category selected by the user is plug-ins, then in step 2709 the user selects plug-in to copy or add a new plug-in. In step 2710, the plug-in record is opened and in step 2706, the device data database is updated accordingly. The category selected is system, then in step 2711, the user selects a device to copy or adds a new device. In step 2712, the system device record is opened and in step 2706 the device data database is updated accordingly. Finally if the category selected is miscellaneous then in step 2713, the user selects device to copy a new device or to add and in step 2714, the miscellaneous device record is opened such that the category may be edited accordingly. The device data database is then updated in step 2706.

Figure 28:
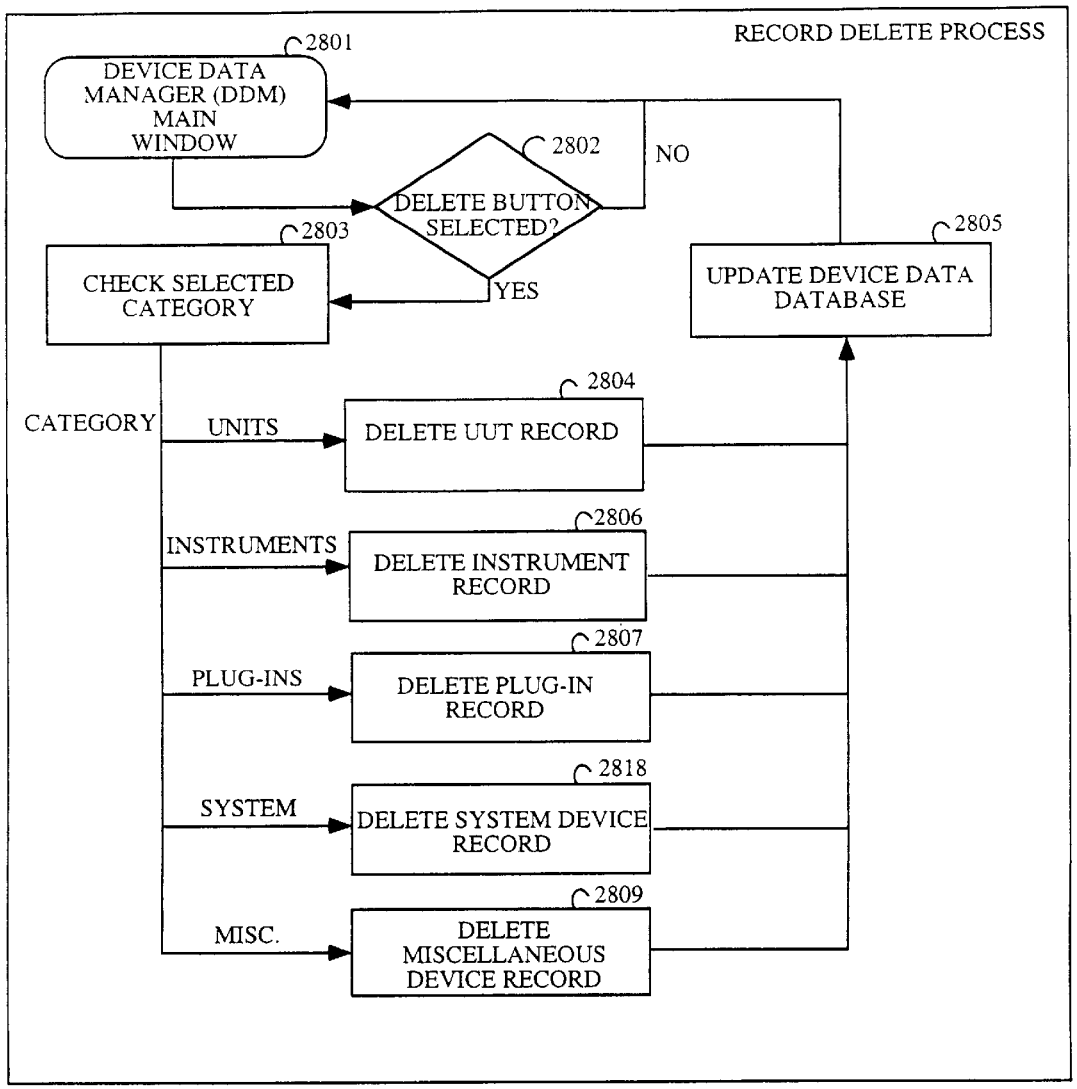
FIG. 28 is a process flow for deleting a record using the device data manager of the present invention.

FIG. 28 is a process flow for deleting a record using the DDM of the present invention. Once the user selects the delete button on the main window, the main window process launches the record delete process passing parameters indicating the selected category and record name. The record delete process deletes the selected record and updates the device data database. The process then terminates and the main window process resume.

In step 2801, the device data manager main window is displayed to the user. In step 2802, the user selects the DELETE button. In step 2803, the DDM checks the category selected by the user for deletion. If the category selected is units, then in step 2804, the UUT record is deleted and the device data database is updated in step 2805. If the category selected is instruments, then the instrument record is deleted in step 2806 and the device data database is updated in step 2805. If the category selected is plug-ins, then the plug-in record is deleted in step 2807 and the device data database is updated in step 2805. If the category selected is system, then the system device record selected is deleted in step 2808 and the device data database is updated in step 2805. Finally, if the category selected is miscellaneous, then the miscellaneous device record selected is deleted in step 2809 and the device data database is updated accordingly in step 2805.

Figure 29:
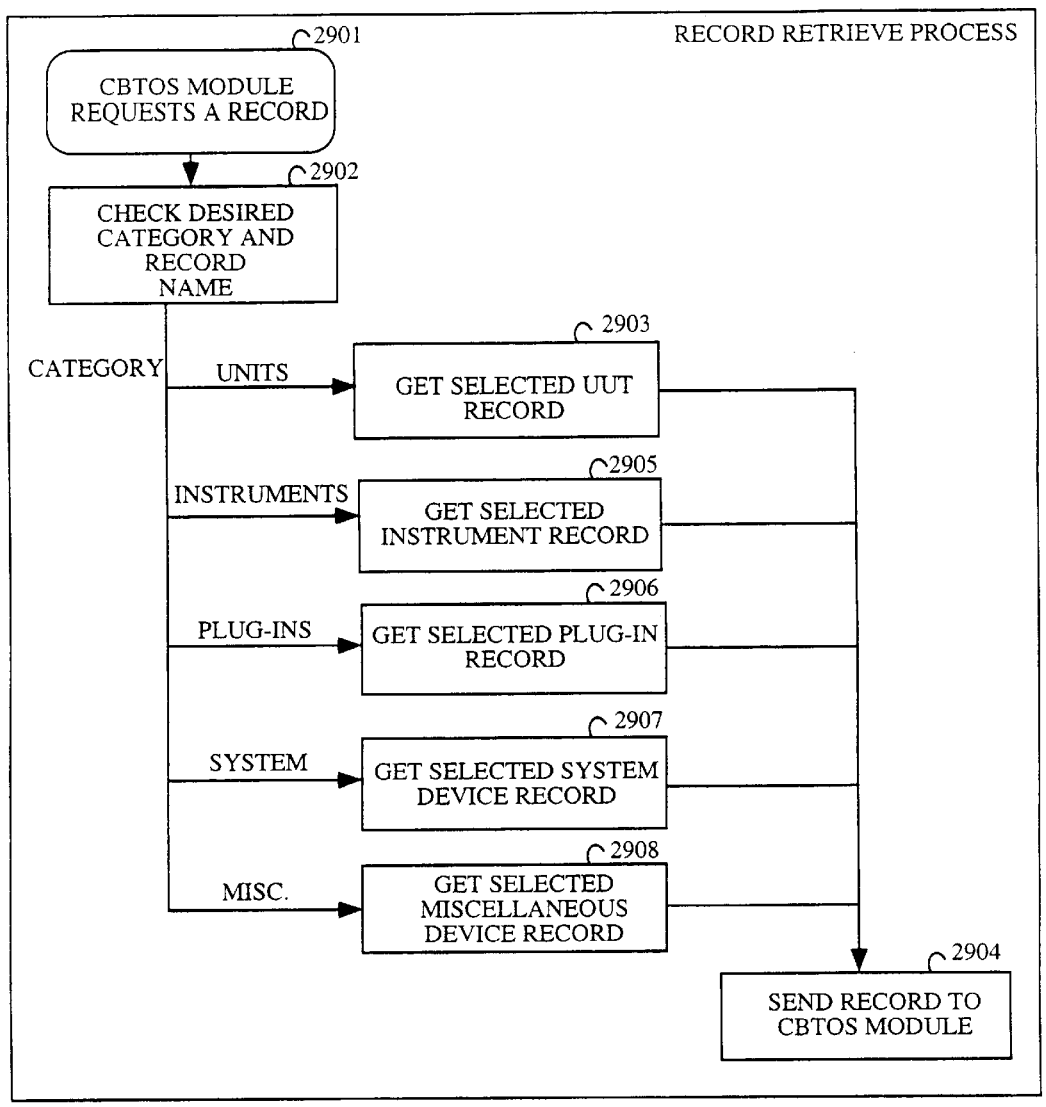
FIG. 29 is a process flow for retrieving a record using the present invention's device data manager.

FIG. 29 is a process flow for retrieving a record using the present invention's DDM. The record retrieval process is launched by another CBTOS module which request a device data record. The module sends a message to the device data manager requesting data. In general, the request enclosed parameters indicating the category and record name. The DDM returns the data pertinent to the selected record and passes the data back to the calling application.

In step 2901 an application requests a record from the device data database. In step 2902, the device data manager checks the category and record name desired by the application requesting the record. If the category desired is units, then in step 2903 the selected UUT record is retrieved and in step 2904 the record is transmitted to the requesting application. If the category requested is instruments, then in step 2905 the instrument record selected is retrieved and in step 2904, the record is transmitted to the requesting application. If the category is plug-ins then, the selected plug-in record is retrieved in step 2906 and the record is transmitted to the requesting application in step 2904. If the category is systems, then the system device record selected is retrieved in step 2907 and the record is transmitted to the application in step 2904. Finally, if the selected category is miscellaneous then in step 2908, the selected miscellaneous device record is retrieved and the record is transmitted to the requesting application in step 2904.

What has been described is a computer based test operating system (CBTOS) which reduces the overall software development costs by minimizing the time required to generate computer based test procedures. The CBTOS of the present invention has various features including a test procedure and a graphical user interface (GUI). The present invention's GUI allows non-software developers to create inter-edit test procedures for a variety of units under test (UUTs). Further, the GUI allows the definition of supporting test devices required to test a UUT as well as allowing the definition and protocols for specific UUT communications interfaces. Additionally, the GUI of the present invention allows the management of users, passwords and authorizations. The four main components of the CBTOS are a tolerance manager (TM), a test procedure editor (TPE), a device data manager (DDM) and a instrument interface module (IIM).

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for a computer based test operating system (CBTOS) to provide a platform for testing at least one unit under test's (UUT)'s behavior with a plurality of physical instruments, said at least one UUT being tested by a test program executed by said CBTOS, said method comprising:

accepting instrument parameters to be transmitted to said plurality of physical instruments, said accepting including accepting an order by which each of said at least one UUT is to be tested; and running said test program to test said at least one UUT's behavior to said plurality of physical instruments with said transmitted instrument parameters, said running being performed without having to modify said test program to recognize a new instrument's or model's new script each time any one of said plurality of physical instruments is replaced by said new instrument or model.

2. The method claim 1 further comprising translating said instrument parameters to a script recognizable by a corresponding one of a plurality of physical instruments.

3. The method of claim 1 further comprising transmitting said script to the corresponding physical instrument through a corresponding dedicated instrument driver dedicated to each said plurality of physical instruments.

4. The method of claim 1 wherein said accepting further comprises accepting specification by user of said at least one UUT to be tested.

5. The method of claim 1 wherein said accepting further comprises accepting specification by user of said plurality of physical instruments to be used to test said at least one UUT.

6. The method of claim 1 wherein said accepting further comprising accepting associated tolerance data for use as a measure to determine pass or failure of a given test.

7. The method of claim 1 wherein said accepting being performed through a graphical user interface.

8. The method of claim 1 wherein said accepting further comprises accepting order by which each said instrument parameters is to be applied to each said plurality of physical instruments to test said UUT.

9. The method of claim 2 wherein said translating further comprises identifying operational modes of said instrument.

10. The method of claim 1 wherein said running further comprises monitoring returned measurement from said plurality of physical instruments resulting from said test.

11. The method of claim 6 further comprising storing said associated tolerance data in a test file, said associated tolerance data being specific to each said plurality of physical instruments.

12. The method of claim 6 further comprising updating said tolerance data with new data when any one of said plurality of physical instruments is physically replaced by said new instrument or model, said upditing being performed without the need to make corresponding changes to said test program.

13. The method of claim 1 wherein said accepting further comprises accepting order by which each said plurality of physical instruments is to be used to test each said at least one UUT.

14. The method of claim 9 further comprising creating a control entry for each said operational modes.

15. The method of claim 10 further comprises comparing said returned measurement with an associated tolerance data.

16. The method of claim 12 wherein said updating further comprises invoking current tolerance data from a test file if any exist.

17. The method of claim 14 further comprising linking said control entry to a corresponding function in a dedicated instrument driver.

18. The method of claim 15 comprising displaying a graphical user interface with a current tolerance data.

19. The method of claim 17 further comprising calling a function in said dedicated instrument driver through said control entry's linking if said control entry is enabled.

20. The method of claim 19 further comprising generating a script corresponding to said control entry through said function.

21. A computer system for providing a platform for testing at least one unit under test's (UUT)'s behavior with a plurality of physical instruments, the at least one UUT being tested by a test program executed by said system, said system comprising:
- a plurality of instrument interface modules (IIM) for accepting instrument parameters used during execution of said test program;
- a control panel array for a corresponding one of said plurality of physical instruments, said control panel array including a plurality of control entries for storing said instrument parameters, each of said plurality of control entries including a flag indicating whether each of said plurality of control entries is enabled, each of said plurality of control entries being enabled when a corresponding one of said instruments is stored; and
- said test program to test said at least one UUT with said plurality of physical instruments having said instrument parameters, said test program capable of interfacing with said plurality of physical instruments for performing said testing without said test program being re-written to recognize a new instrument's or model's new script each time any one of said plurality of physical instruments is replaced by said new instrument or model, said test program coupled to said plurality of IIMs.

22. The system of claim 21 wherein said plurality of IIM translates said instrument parameters to script recognizable by a corresponding one of said plurality of physical instruments, transmits said translated instrument parameters to the corresponding physical instrument through a corresponding dedicated instrument driver dedicated to each said plurality of physical instruments.

23. The system of claim 21 further comprises an IIM translator for a corresponding one of said plurality of IIMs for identifying operational modes of a corresponding one of said plurality of physical instruments, creating a corresponding one of said plurality of control entries in said control panel array for each identified operational mode and linking each said plurality of control entries to a corresponding function in said dedicated instrument driver for invoking said corresponding function.

24. The system of claim 22 further comprising a device data manager for accepting specification of said at least one UUT to be tested and said plurality of physical instruments to be used to test at least one UUT, said device data manager storing said specification in a device data database for later use by said test program when testing said at least one UUT.

25. The system of claim 22 further comprises a test file for storing test information for use by said system when running said test program to test said at least one UUT, said test file coupled to said plurality of IIMs.

26. The system of claim 22 wherein said IIM comprises a graphical user interface through which a user remotely controls said instrument parameters of said plurality of physical instruments.

27. The system of claim 22 further comprising a tolerance manager for accepting tolerance data to be associated with any one of said plurality of physical instruments, said tolerance data being stored in a test file for later use by said test program to test said at least one UUT.

28. The system of claim 22 further comprising a test procedure editor for accepting the order by which each said at least one UUT is tested and the order by which each said plurality of physical instruments is used to test said at least one UUT, said test procedure editor storing said order in a test file.

29. The system of claim 22 further comprising a test executive module for running a test program in an order as saved in said test file.

30. The system of claim 26 wherein said IIM generates scripts equivalent to each said instrument parameters in a corresponding one of a plurality of control entries, said scripts being recognizable by said corresponding one of said plurality of physical instruments.

31. A test system for providing a platform for testing, at least one units under test's (UUT)'s behavior with a plurality of physical instruments, said at least one UUT being tested by a test program, said system comprising:
- said plurality of physical instruments;
- a storage element coupled to said plurality of physical instruments, said storage element including,
  - a plurality of instrument interface modules (IIM) for accepting instrument parameters used during execution of said test program, and
  - said test program used to test said at least one UUT with said plurality of physical instruments having said instrument parameters, said test program capable of interfacing with said plurality of physical instruments for performing said testing without being modified to recognize a new instrument's or model's new script each time any one of said plurality of physical instruments is replaced by said new instrument or model, said test program coupled to said plurality of IIMs;
- a control panel array for a corresponding one of said plurality of physical instruments, said control panel array including a plurality of control entries for storing said instrument parameters, each said plurality of control entries including a flag indicating whether said each said plurality of control entries is enabled, each said plurality of control entries being enabled when a corresponding one of said instrument parameters is stored; and a processor for driving said plurality of IIMs and said test program, said processor coupled to said storage element.

32. The system of claim 31 wherein said plurality of IIM's translates said instrument parameters to script recognizable by a corresponding one of said plurality of physical instruments, transmits said translated instrument parameters to the corresponding physical instrument through a corresponding dedicated instrument driver dedicated to each said plurality of physical instruments.

33. The system of claim 32 further comprises an IIM translator for a corresponding one of said plurality of IIMs for identifying operational modes of a corresponding one of said plurality of physical instruments, creating a corresponding one of said plurality of control entries in said control panel array for each identified operational mode, linking each said plurality of control entries to a corresponding function in said dedicated instrument driver for invoking said corresponding function and generating scripts equivalent to each said instrument parameters in a corresponding one of said plurality of control entries in response to said invoking, said scripts being recognizable by said corresponding one of said plurality of physical instruments.

34. The system of claim 31 further comprising a device data manager for accepting specification of said at least one UUT to be tested and said plurality of physical instruments to be used to test at least one UUT, said device data manager storing said specification in a device data database for later use by said test program when testing said at least one UUT.

35. The system of claim 31 further comprises a test file for storing test information for use by said system when running said test program to test said at least one UUT, said test file coupled to said plurality of IIMs.

36. The system of claim 31 wherein said IIM comprises a graphical user interface through which a user remotely controls said instrument parameters of said plurality of physical instruments.

37. The system of claim 31 further comprising a tolerance manager for accepting tolerance data to be associated with any one of said plurality of physical instruments, said tolerance data being stored in a test file for later use by said test program to test said at least one UUT.

38. The system of claim 31 further comprising a test procedure editor for accepting the order by which each said at least one UUT is tested and the order by which each said plurality of physical instruments is used to test said at least one UUT, said test procedure editor storing said order in a test file.

39. The system of claim 31 further comprising a test executive module for running said test program in an order as saved in a test file.

40. A method for testing at least one unit under test's (UUT)'s behavior to a physical instrument, said at least one UUT being tested by a test program, said method comprising:

accepting at least one test tolerance criterion, said at least one test tolerance criterion being modifiable without the need to re-write said test program when said at least one test tolerance criterion is modified, said accepting including accepting an order by which each of said at least one UUT is to be tested;

running said test program to test said at least one UUT's behavior to said physical instrument, said at least one UUT and said physical instrument producing a measurement in response to said running said test program; and comparing said measurement from said at least one UUT and said physical instrument with said at least one tolerance criterion, said test program resulting in a pass result if said measurement is within said at least one tolerance criterion and otherwise resulting in a fail result.

41. The method of claim 40 wherein said accepting further comprises accepting specification by user of said at least one UUT to be tested.

42. The method of claim 40 wherein said accepting being performed through a graphical user interface.

43. The method of claim 40 wherein said running further comprises monitoring returned measurement from said at least one UUT and said physical instrument resulting from said test.

44. The method of claim 40 further comprising storing said at least one test tolerance criterion in a test file.

45. The method of claim 44 further comprising retrieving said at least one test tolerance criterion for use in said comparing said measurement.

46. A method for a test procedure editor for testing at least one unit under test's (UUT)'s behavior to a physical instrument using instrument parameters, said at least one UUT being tested by a test program, said method comprising:

accepting a new order in which said at least one UUT is to be tested and in which said instrument parameters are to be used to test said at least one UUT, said accepting a new order replacing an old order with said new order, said accepting being performed without requiring said test program to be re-written each time said old order is replaced with said new order; and running said test program to test said at least one UUT's behavior to said physical instrument using said instrument parameters in said new order.

47. The method of claim 46 wherein said accepting further comprises accepting specification by user of said at least one UUT to be tested.

48. The method of claim 46 wherein said accepting further comprises accepting specification by user of said instrument parameters.

49. The method of claim 46 wherein said accepting being performed through a graphical user interface.

50. The method of claim 46 wherein said accepting further comprises storing said new order in a test file.

51. The method of claim 46 further comprises retrieving said new order prior to said running test program.

52. A test procedure editor (TPE) for testing at least one unit under test's (UUT)'s behavior with a physical instrument using instrument parameters, the at least one UUT being tested by a test program, said apparatus comprising:

a TPE initializer for accepting specification of said at least one UUT to be tested and said instrument parameters; and a TPE editor for editing an order in which said at least one UUT is to be tested and in which said instrument parameters are to be used to test said at least one UUT, said editing being performed without the need to re-write said test program each time said order is edited; and said test program for testing said at least one UUT with said physical instrument using said instrument parameters in said order.

53. A device data manager for testing at least one unit under test's (UUT)'s behavior with a physical instrument, the at least one UUT being tested by a test program, said apparatus comprising:

a device data database for storing a list of said at least one UUT to be tested;

a record edit process for editing said device data database by adding and deleting listed said at least one UUT to be tested, said record edit process coupled to said device data database; and said test program for testing said at least one UUT with said physical instrument using said instrument parameters in an order in which said at least one UUT is to be tested and in which said instrument parameters are to be used to test said at least one UUT.

\* \* \* \* \*